United States Patent [19]
Noguchi et al.

[11] Patent Number: 5,793,633
[45] Date of Patent: Aug. 11, 1998

[54] STORAGE MANAGEMENT SYSTEM

[75] Inventors: Yasunori Noguchi; Kenichi Ohara; Makoto Nakashima; Satoshi Nakano, all of Hiroshima-ken, Japan

[73] Assignee: Mazda Motor Corporation, Hiroshima-ken, Japan

[21] Appl. No.: 351,217

[22] Filed: Nov. 30, 1994

[30] Foreign Application Priority Data

Dec. 1, 1993 [JP] Japan ................................. 5-301788
Dec. 28, 1993 [JP] Japan ................................. 5-336075

[51] Int. Cl.[6] ............................................. G06F 19/00
[52] U.S. Cl. .......................... 364/468.01; 364/478.02
[58] Field of Search ................................ 364/468, 478, 364/403, 552, 468.01–468.28, 478.01, 478.18; 414/331, 273, 786, 222

[56] References Cited

U.S. PATENT DOCUMENTS

| 4,729,105 | 3/1988 | Thompson et al. | 364/478 |
| 4,932,828 | 6/1990 | Katae et al. | 364/478 |
| 5,373,451 | 12/1994 | Furukawa | 364/478 |

Primary Examiner—Reba I. Elmore
Assistant Examiner—Steven R. Garland
Attorney, Agent, or Firm—Morrison & Foerster I

[57] ABSTRACT

A storage management system controls work supply to and work delivery from a work depot station disposed between two processing stations on a work transportation line where receptacles are loaded with a plurality of kinds of works so as to maintain an appropriate size of stock of various kinds of works which are neither too much nor too little and deliver precisely works of any specific kind in conformity with a request of delivery from the succeeding station.

9 Claims, 20 Drawing Sheets

| PN | WORK |
|---|---|
| 0 | WB |
| 1 | WD |
| 2 | WA |
| 3 | WC |

| PN | WORK |
|---|---|
| 0 | WE |
| 1 | WG |
| 2 |  |
|  |  |

| PN | WORK |
|---|---|
| 0 | WF |
| 1 | WH |
| 2 | WI |
| 3 |  |

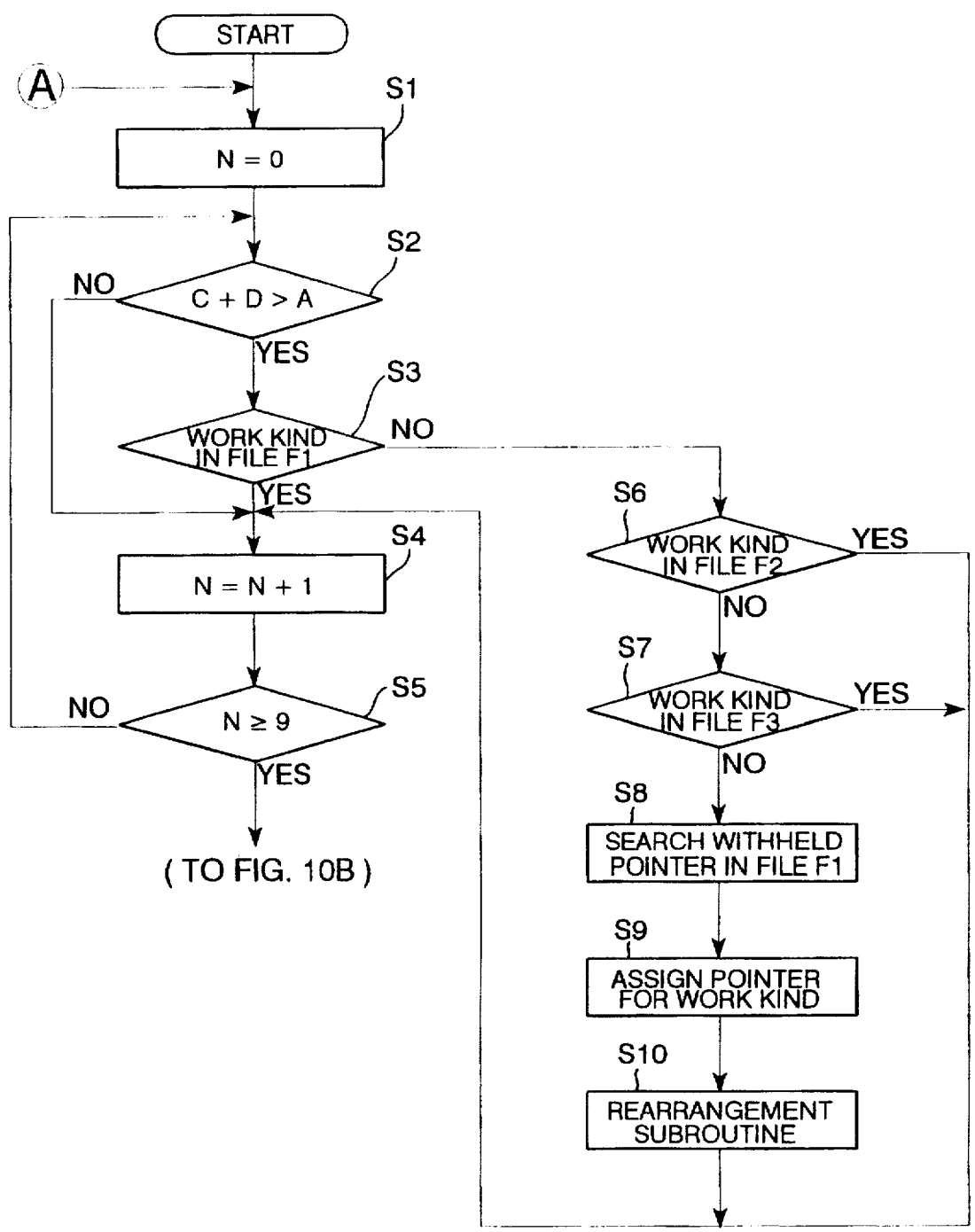

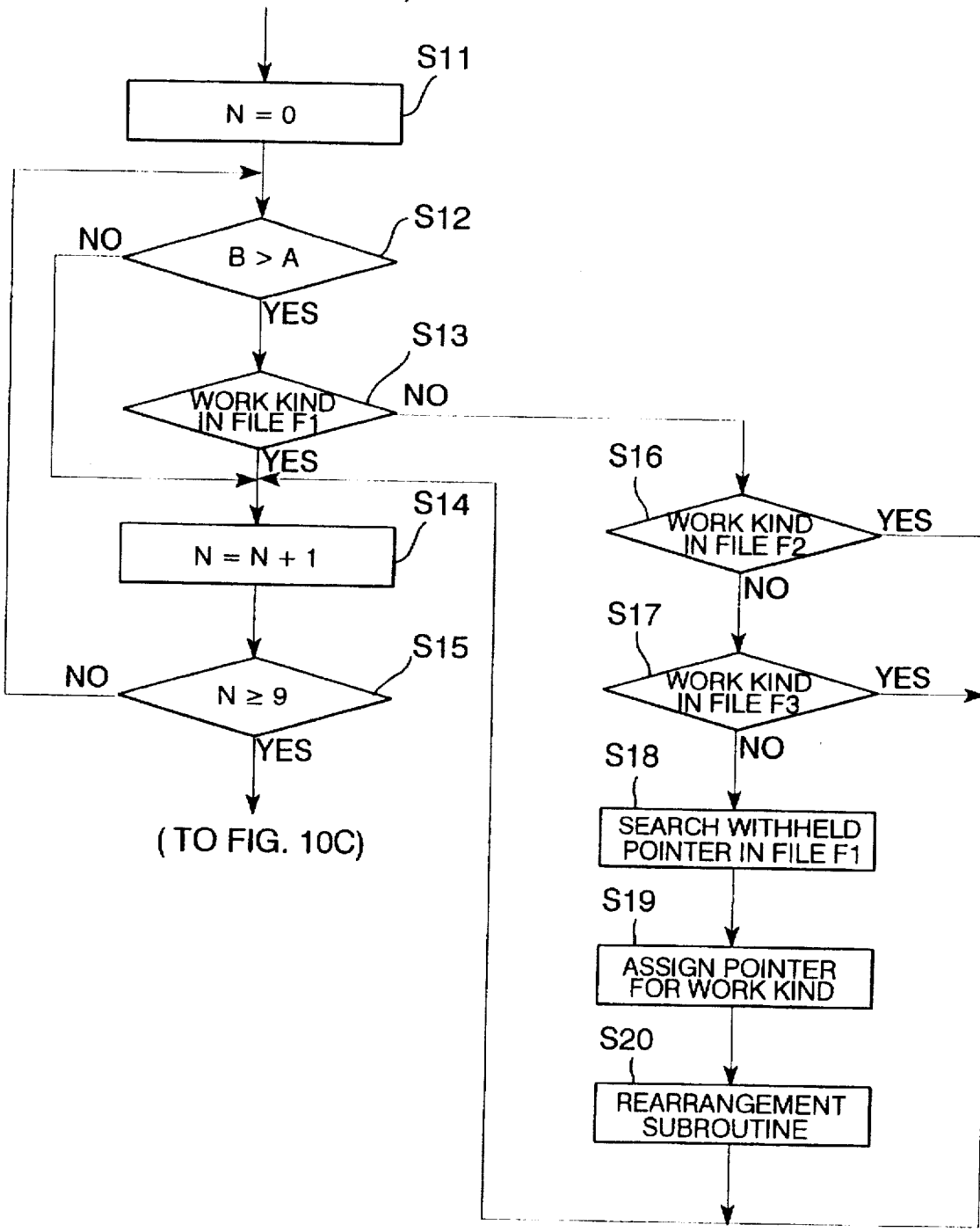

DATA ERASE SUBROUTINE

S201

DELETE WORK KIND IN FIRST PLACE OF DATA FILE F3

S202

SHIFT FOLLOWING WORK KIND TO FIRST PLACE

RETURN

FIG. 13

| PN | WORK |
|---|---|
| 0 | WA |
| 1 | WD |
| 2 | WC |
| 3 | WE |

| PN | WORK |
|---|---|
| 0 | |
| 1 | WD |
| 2 | WC |
| | WE |

| PN | WORK |
|---|---|
| 0 | WD |
| 1 | WC |
| 2 | WE |
| 3 | |

STORAGE MANAGEMENT SYSTEM

BACKGROUND OF THE INVENTION

1. Field of the invention

The present invention relates to a work depot management system, and, more particularly, to a work depot management system for managing the stock of works in a work depot station located between two adjacent work stations on a work transportation line and temporarily detaining the works in storage cells of the work depot station, and thereafter delivering specified works at requests of delivery from the succeeding work station.

2. Description of Related Art

A storage system includes a work handling apparatus for bringing articles or works into a work store having a number of storage cells or receptacles or a number of shelves and bringing out a specified work at the request of delivery from the succeeding work station. Such a work storage equipment is known from, for instance, Japanese Unexamined Patent Publication No. 62-244,804.

In the case where the work storage equipment of this type is disposed between two adjacent work stations, such as a work machining station and a work assembling station in a work transportation line, and machined works are brought into the work storage equipment for temporarily detention in the storage cells or on the shelves and thereafter, automatically carried out of the storage cells or the shelves at the request of the assembling station, if different kinds of machined works are mixed on the transportation line, machined works which each of the storage cells temporarily detain change in kind with the progress of time. For instance, if two kinds of works A and B are supplied from the preceding station to the storage station and received in the storage cells, a work B is possibly received into one of the storage cells in which a work A was previously received and detained and from which the work A has been carried out at the request of delivery from the succeeding station. In other words, there are two periods of time for each storage cell, such as time zones Ta for which works A are detained in the storage cell and time zones Tb for which works B are detained in the storage cell. In the case where works temporarily detained in each storage cell changes in kind with the progress of time in such a way, in order for the work handling apparatus to take a correct kind of works out of the storage cells at the request of delivery from the succeeding station, it is always essential to recognize the location of the storage cell where the requested kind of work is detained. As a matter of fact, it is very difficult to recognize different kinds of works arbitrary brought into the storage cells. In particular, in the case where a great number of storage cells are provided, there are fears for the work handling apparatus of taking out a work of a kind inconsistent with the request of delivery from the succeeding station. Accordingly, it has proved to be necessary to improve as far as possible the storage management system of this type.

In addition, it is preferred to store an appropriate size of stock of various kinds of works which are neither too much nor too little. For instance, in the case where the work transportation line supplies three kinds of works A, B and C, if, while the stock of works A and B is appropriate, the stock of works C is in short supply in the depot station, it is possibly difficult to deliver the works C in response to requests from the succeeding station. This leads to suspending the work transportation line and supplementary supply of works C to the work depot station, and sometimes to an insufficient space for works C due to an excessive size of stock of works A and B, causing a considerable reduction in work transportation efficiency.

SUMMARY OF THE INVENTION

It is an object of the present invention to provide a storage management system of a work depot station for delivering precisely works of any specific kind in conformity with a request of delivery from the succeeding station.

It is another object of the present invention to provide a storage management system of a work depot station for maintaining an appropriate size of stock of various kinds of works which are neither too much nor too little.

The above object of the present invention is achieved by providing a storage management system for a work depot station disposed between two stations on a work transportation line for temporarily loading receptacles of the work depot station with a plurality of kinds of works fed from a preceding station one after another by means of a work handling apparatus and delivering works of a kind in conformity with a request from a succeeding processing station by means of said work handling apparatus. The storage management system has data control means for storing work data of a work put in each receptacle, for replacing the work data stored therein with work data of another work with which the receptacle previously loaded with the work is loaded, and for searching the work data of the works in the receptacles so as to find any one of the receptacles loaded with the works of a specific kind in conformity with a request of delivery from the succeeding station. The work handling apparatus is driven to put out a work in the receptacle found.

A work inspection means is provided before the work depot station for a sampling inspection of one out of a lot of works in order to decide acceptance and rejection of the lot and providing for the data control means a retention signal for prohibiting access of the work handling apparatus to the receptacles which are loaded with the works of the lot under inspection until the sampling inspection is finished. If the sampling inspection indicates that the lot is rejected, the work handling apparatus is caused to draw out all of the works of the rejected lot from the work depot station.

The data control means of the storage management system further stores the numbers of each kind of works in stock in the work depot station so as to compare the number with a lower stock limitation intrinsic to the work kind and find any kind of works whose number is less in stock than the lower stock limitation. As a result, a preferential entry of the kind of works found to be less in stock than the lower stock limitation is provided for the work depot station.

Similarly, the data control means compares the number with an upper stock limitation intrinsic to the work kind and finds any kind of works whose number is greater in stock than the upper stock limitation so that an entry of the kind of works found to be greater in stock than the upper stock limitation is suspended.

The work depot station may include a plurality of work stores along the work transportation line which are loaded with various kinds of works in order from a foremost work store to a rearmost work store. A preferential entry of works of the kind which is found to be in short supply less than the lower stock limitation is provided into a rearmost work store among the work stores which are found to be less in stock than the lower stock limitation with respect to the kind of works.

Further, the work transportation line may include a plurality of preceding stations one for one kind of works so as to provide a preferential entry of a kind of works found to be in short supply than the lower stock limitation is provided from one of the preceding stations assigned for the kind of works.

Alternatively, a plurality of provisional work depot stations may be installed one for one kind of works. In this instance, a preferential entry of a kind of works found to be in short supply than the lower stock limitation is provided from one of the provisional work depot stations assigned for the kind of works.

In any case, if a kind of works is found to be supplied in excess than the upper stock limitation, the proceeding station, the work store or the provisional work depot station assigned for the kind of works in over supply is suspended in place of being providing a preferential entry of the kind of works.

With the storage management system of the present invention, the delivery of works is performed based on work data varying with the progress of time, works of a kind in conformity with a request is precisely delivered to the succeeding station. All the works of a lot are retained from delivery to the succeeding station until a sampling inspection decides the lot to be acceptable, the succeeding station is supplied only acceptable works. If any kind of works is in short supply, a preferential supply is conducted for the kind of works, or if in over supply in the work depot station, supply of the kind of works is suspended. This results in an appropriate size of stock of various kinds of works which are neither too much nor too little, providing a considerable increase in working efficiency of the work transfer line.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIGS. 9A-9C are illustrations of a basic loading order data file, an interrupt loading data file and a definite loading data file, respectively;

FIGS. 10A-10F are a flow chart illustrating a storage monitoring main routine for the microcomputer;

FIG. 13 is illustrations showing data erase and shift operation;

DETAILED DESCRIPTION OF THE PREFERRED EMBODIMENTS

Figure 1:
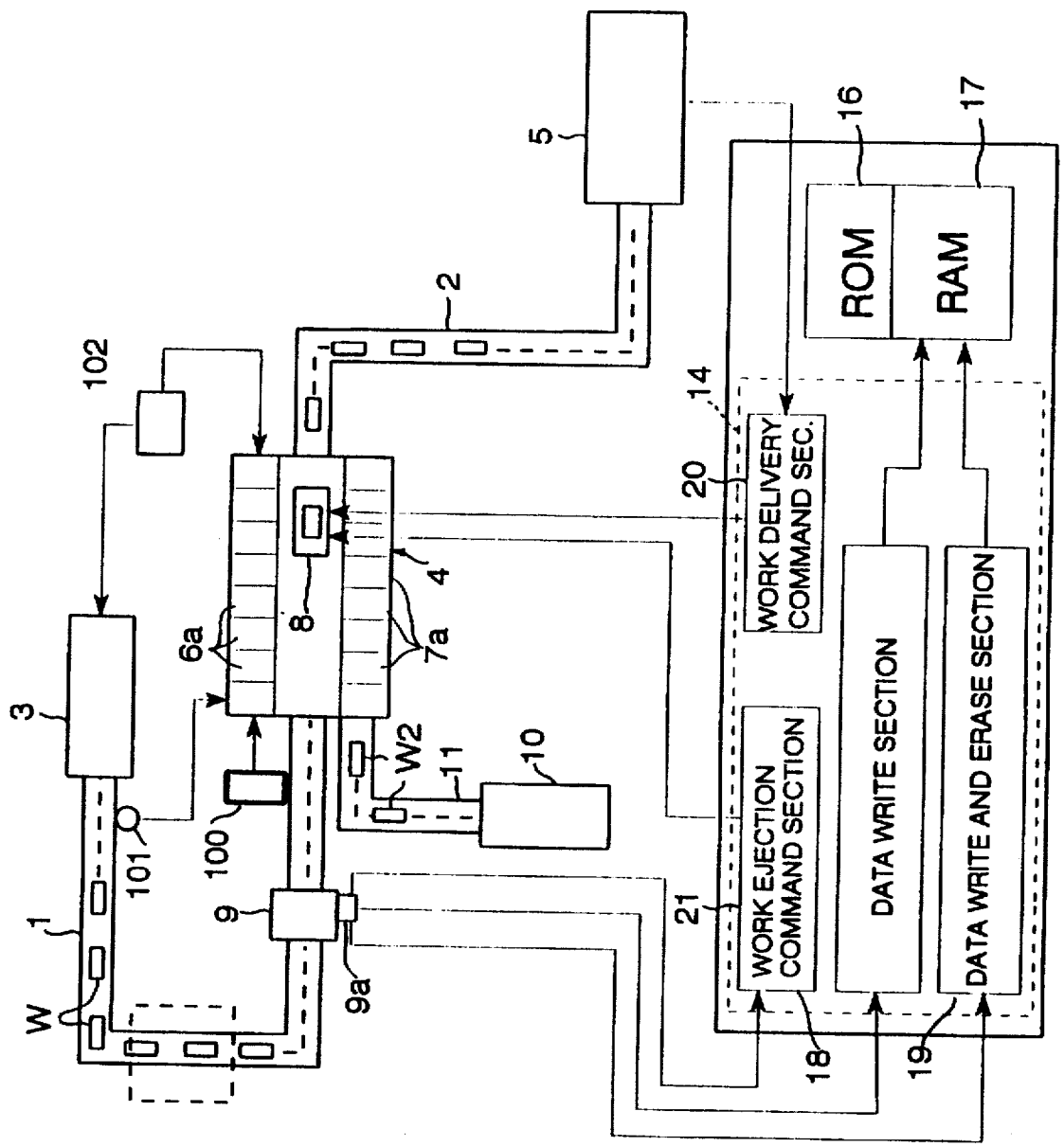
FIG. 1 is a schematic illustration of a work transportation line incorporating a storage management system in accordance with a preferred embodiment of the present invention.

Referring now to the drawings in detail, and in particular, to FIG. 1, a work transportation line including a storage management system in accordance with a preferred embodiment of the present invention is shown. The transportation line has a preceding work station, such as a machining station 3 for machining different kinds of material works W including, for instance, cylinder blocks and cylinder heads, and a succeeding work station, such as an assembling station 5 for assembling the machined works W to, for instance, automobile engine units (not shown). Alternatively, a material work supply station may be installed in place of the machining station 3 so as to supply machined works toward the succeeding station. Between the machining and assembling stations 3 and 5 there is installed a work depot station 4. These work stations 3 and 5 and the depot station 4 are connected by means of first and second transportation conveyers 1 and 2. The first transportation conveyer 1 transports the machined works W one after another to the work depot station 4 where first and second work stores 6 and 7 having a great number of storage cells 6a and 7a, respectively, are provided (see FIGS. 2-4). The work depot station 4 may have a single store 6 or 7a disposed aside the work transportation line. The second transportation conveyer 2 transports machined works W took out of the work depot station 4 and placed thereon to the assembling station 5. The machined works W are loaded and detained in these storage cells 6a and 7a of the first and second work stores 6 and 7 one per each storage cell. At the request of delivery from the assembling station 5, one machined work W of the kind in conformity with the request is taken out of a storage cell of either one of the first and second work stores 6 and 7 and placed on the second transportation conveyer 2 for delivery to the assembling station 5.

Figure 2:
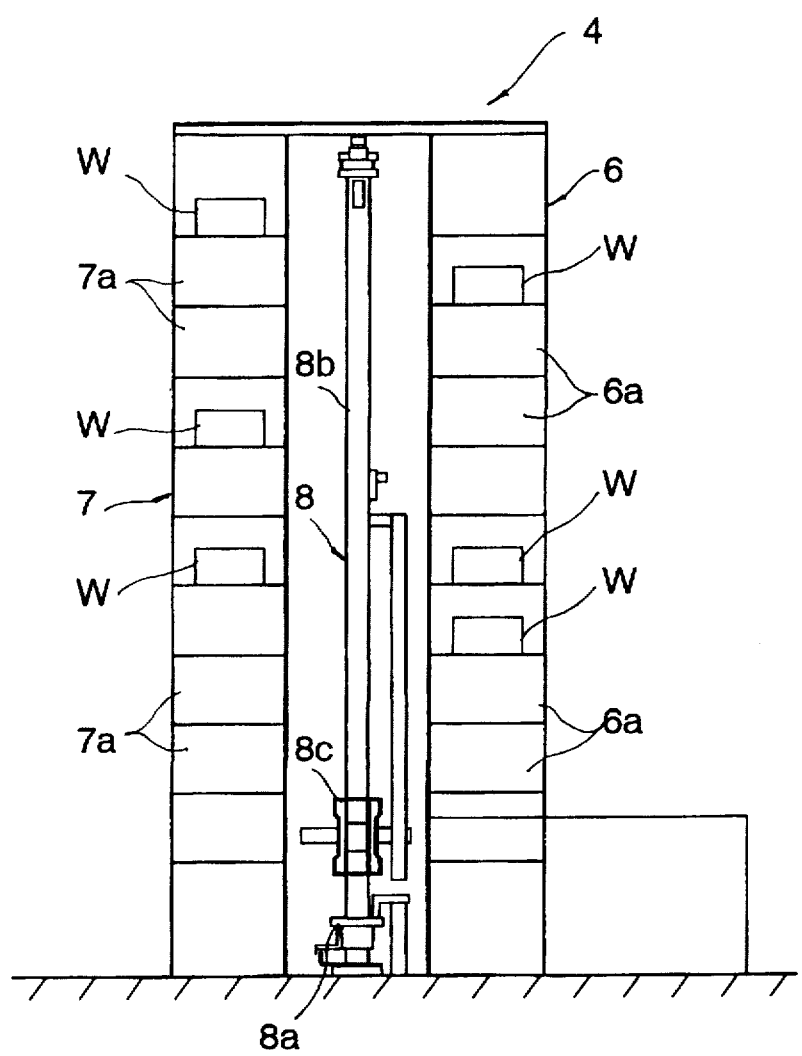
FIG. 2 is a front view of a work depot station of the work transportation line of FIG. 1.
Figure 3:
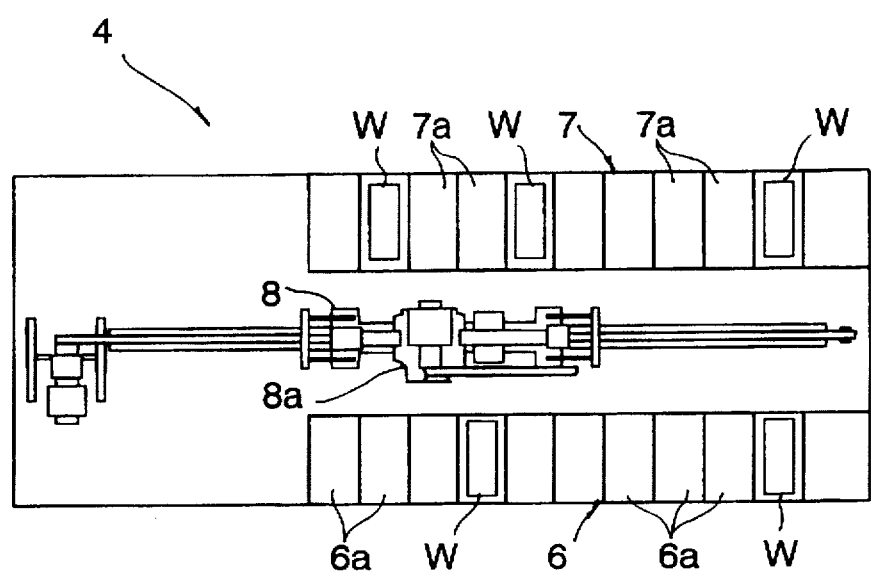
FIG. 3 is a plan view of the work depot station.
Figure 4:
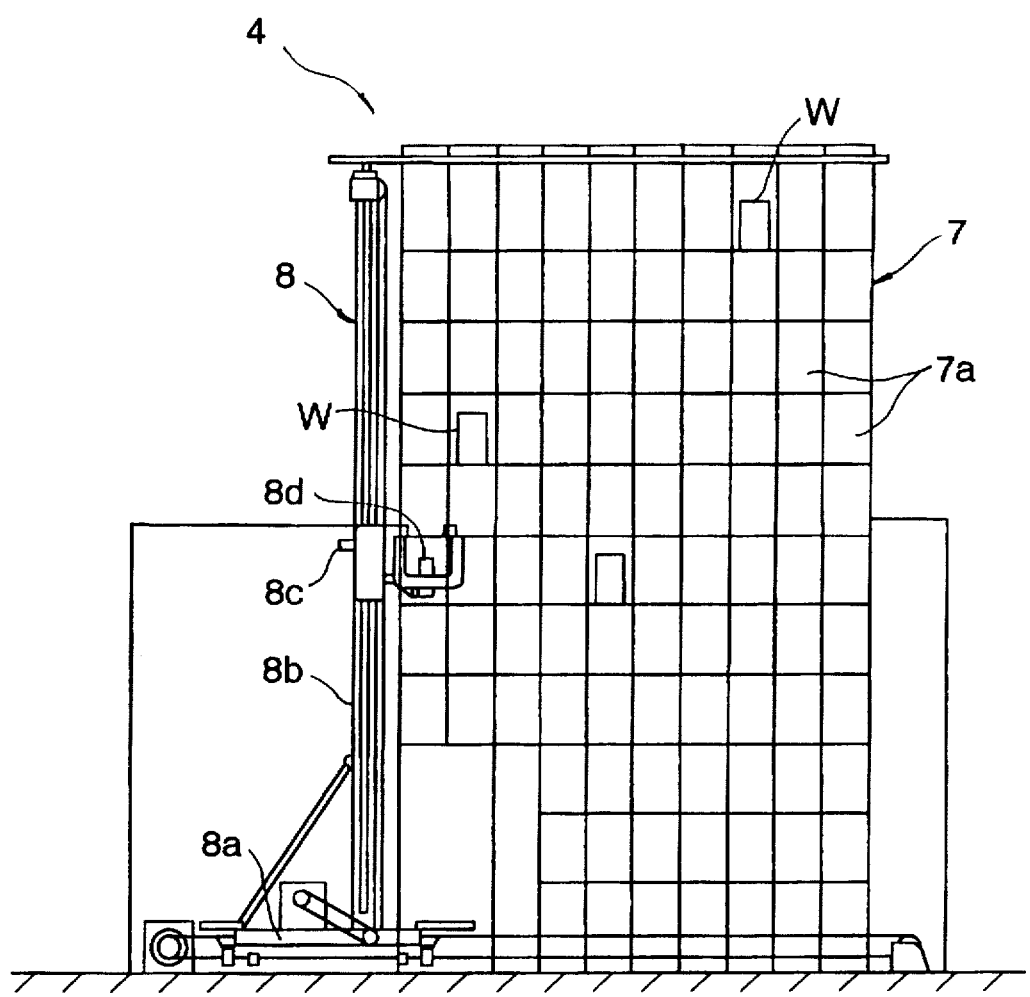
FIG. 4 is a side view of the work depot station.

Referring to FIGS. 2-4 showing the work depot station 4, the first work store 6 is disposed on one side and in parallel with the first and second transportation conveyers 1 and 2 and provided with a number of the storage cells 6a arranged in a vertical matrix pattern. Similarly, the second work store 7 is disposed on another side and in parallel with the first and second transportation conveyers 1 and 2 so as to face the first work store 6 and provided with a number of the storage cells 7a arranged in a vertical matrix pattern. These first and second work stores 6 and 7 are disposed with a separation in a transverse direction perpendicular to the first and second transportation conveyers 1 and 2. There is a motor driven work handling apparatus 8 disposed between the first and second work stores 6 and 7. This work handling apparatus 8, such as a stack crane, capable of traveling on a crane rail 8e extending between the first and second work stores 6 and 7, is comprised of a slide shoe 8a mounted for slide movement on the crane rail 8e, a lift column 8b extending vertically upward from the movable shoe 8a, a lifter 8c mounted for up and down slide movement to the lift column 8b, and a work hand 8d attached to the lifter 8c. The work depot station 4 is formed at one end adjacent to the first transportation conveyer 1 with an entrance (not shown) through which the subject works W are carried in from the first transportation conveyer 1 and at another end adjacent to the second transportation conveyer 2 with an exit (not shown) through which the subject works W are carried out onto the second transportation conveyer 2.

Briefly stated the work handling apparatus 8 is controlled in a time sequence by means of a control unit 15 mainly comprised of a microcomputer (MC) 14, which will be described in detail later, to move the slide shoe 8a so as to place the work hand 8d adjacently to an entrance of the work depot station 4, actuate the work hand 8d to hold a work W placed on the first transportation conveyer 1, and shift the lifter 8c up or down while carrying back the slide shoe 8d so as to place the work W held by the work hand 8d at a designated one of empty storage cells 6a and 7a of the work stores 6 and 7. Thereafter, the work handling apparatus 8 actuates the work hand 8d to load the designated work cell 6a or 7a with the work W. Upon a request of delivery from the assembling station 5, the work handling apparatus 8 moves the slide shoe 8a and shifts the lifter 8c up or down so as to place the work hand 8d at a designated storage cell 6a or 7a of the work stores 6 and 7. Subsequently, the work handling apparatus 8 actuates the work hand 8d to pick up the subject work W in the designated work cell 6a or 7a and moves back the slide shoe 8a toward an exit of the work depot station 4 where the second transportation conveyer 2 is.

Referring back to FIG. 1, there is provided a sampling inspection device 9 disposed before the work depot station 4 for sampling and inspecting one out of one lot of machined works W. The lot size may be, for instance in an automobile engine production line, forty (40). Further, there is installed a corrective work line 10 for manual correction to which defective works W2 are drawn out through a draw-out transportation conveyer 11. Defective works W2, which are automatically sorted, are taken out of the storage cells 6a and 7a of the work stores 6 and 7 and loaded on or supplied to the draw-out transportation conveyer 11 by the work handling apparatus 8. Accordingly, the work handling apparatus 8 loads the second transportation conveyer 2 with conforming works W1 only.

The control unit 15 for performing work storage management has a read only memory (ROM) 16 and a random access memory (RAM) 17. The ROM 16 stores data of addresses intrinsic to the respective storage cells 6a and 7a of the work stores 6 and 7. The control unit 15 refers to the ROM 16 for the address information about a storage cell 6a, 7a adjacent to the work hand 8d of the work handling apparatus 8 based on horizontal and vertical distances of movement of the work hand 8d. These horizontal and vertical distances may be found in any well known manner, for instance, based on rotated angles of motors of the work handling apparatus 8. In addition, the control unit 15 detects which work store 6a, 7a, the work hand 8d is directed to. This direction may be also found based, for instance, on the rotational direction of a motor for the work hand 8d. On the other hand, the RAM 17 stores data relating to kinds of respective works W and the storage cells 6a and 7a loaded with the respective works W. More specifically, the RAM 17 contains various data registers, such as an occupancy data resister for information regarding the occupancy of each storage cell, a detention data register for information as to whether each work W is ready to be delivered, or otherwise should be detained or withheld from delivery, to the assembling station 5, a work kind data resister for information of kinds of machined works W in the respective storage cells 6a and 7a, and a work quality data resister for information of machined quality, such as conformity or defect, of the machined work W in each storage cell 6a, 7a. These data in the RAM 17 are renewed every time each storage cell 6a, 7a is loaded and unloaded with a machined work W.

The control unit 15 is provided with functional sections, such as a data write section 18, a data write and erase section 19, a work delivery command section 20, and a work ejection command section 21. The data write section 18 writes data relating to machined works W, such as data of the location of a storage cell 6a, 7a loaded with a machined work W, data as to whether the machined work W is under detention from delivery, and data of the kind of the machined work W, in the RAM 17. The data write and erase section 19 writes data of the conformity or the defect of a machined work W in the RAM 17 based on the result of an inspection made at the sampling inspection device 9 and erases data in the RAM 17 relating to the detention of the machined work W. The work delivery command section 20 provides for the work handling apparatus 8 a command signal of work delivery operation on the request of delivery from the assembling station 5. The work ejection command section 21 provides a command signal of operation for the work handling apparatus 8 for ejection of a defective work W2 onto the draw-out transportation conveyer 11.

With the work transportation line thus structured, a first lot of material works are machined one after another at the machining station 3 and subsequently transported by the first transportation conveyer 1 toward the work depot station 4. In this instance, this lot has a lot size of, for instance, forty (40) and contains more than one kind of machined works W. While the machined works W are transported toward the work depot station 4, any one of the machined works W is sampled and inspected at the sampling inspection device 9. At the work depot station 5, these machined works W are placed in empty storage cells 6a and 7a by the work handling apparatus 8. Every time one machined work W is loaded in any one of empty storage cells 6a and 7a, the data write section 18 of the control unit 15 writes data of the location of the storage cell 6a, 7a loaded with the machined work W, data indicating that the loaded machined work W is now under detention from delivery, and data of the kind of the loaded machined work W, in the RAM 17. If the sampled machined work W is judged to be defective, then, all of the machined works W of this lot are regarded as defective. An operator provides for the data write and erase section 19 a conformity instruction signal indicating that the machined works W of this lot are in conformity with required accuracy or quality of machining by pushing an OK button of a control panel 9a, or otherwise provides for the data write and erase section 19 a defect instruction signal indicating that the machined works W of this lot are defective by pushing an NG button of the control panel 9a. According to these instruction signals, the data write and erase section 19 writes location data of the storage cells 6a and 7a loaded with the machined works W of this lot and quality data of the machined works W loaded in these storage cells 6a and 7a in the RAM 17. Simultaneously with writing these storage cell location data and work quality data, the data write and erase section 19 erases the detention data for detention of the machined works W of this lot.

Immediately or at any desired time after the data write and erase section 19 has written the quality data, the work ejection command section 21 provides an ejection command signal so as to cause the work handling apparatus 8 to eject and load all of defective machined works W2 onto the draw-out transportation conveyer 11. On the other hand, when there is issued a request of delivery for a specific kind of a machined work W to the assembling station 5, the work delivery command section 20 provides a work delivery command signal so as to cause the work handling apparatus 8 to search and pick up a conforming machined work W1 of the subject kind in compliance with the request, and loads the second transportation conveyer 2 with the subject kind of work W1.

The operation of the storage management system for the work transportation line depicted in FIG. 1 is best understood by reviewing FIGS. 5–8, which are flow charts illustrating various sequential control routines for the MC 14 of the control unit 15. Programming a computer is a skill well understood in the art and the following description is written to enable a programmer having ordinary skill in the art to prepare an appropriate program for the MC 14. The particular details of any such program would of course depend upon the architecture of the particular computer selected.

Figure 5:
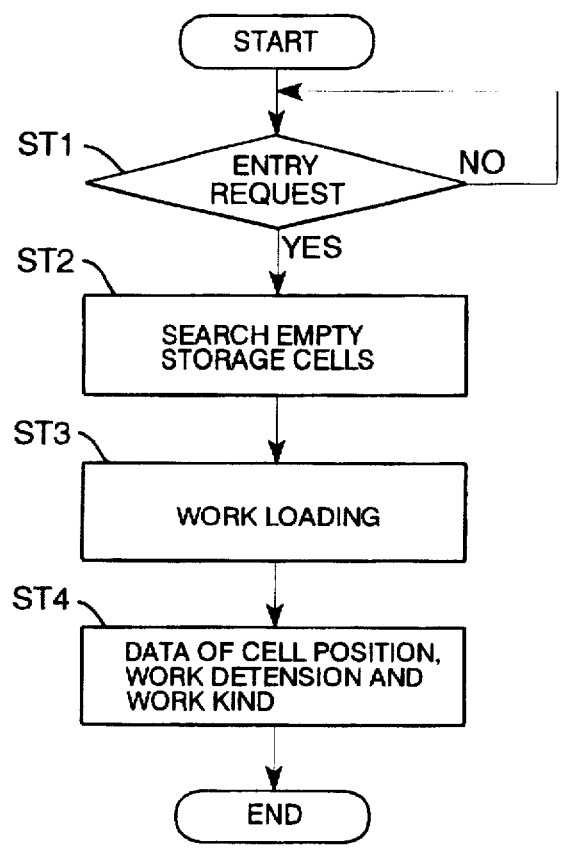
FIG. 5 is a flow chart illustrating a data write routine for the microcomputer.

Referring to FIG. 5, which is a flow chart of the data write routine for the data write section 18 of the MC 14, the flow chart routine commences and control passes directly to a decision block ST 1 where a decision is made as to whether there is a demand for entry of machined works W of a lot into the work depot station 4. If there is the entry demand or the answer to the decision is "YES," a data search is made at step ST2 so as to find empty storage cells 6a and 7a. Thereafter, at step ST3, the work handling apparatus 8 is actuated to load the empty storage cells 6a and 7a with the machined works W. Finally, at step ST4, the data write section 18 of the MC 14 writes data of the location of each storage cell 6a, 7a loaded with the machined work W, data of detention of the loaded machined work W from delivery, and data of the kind of the loaded machined work W, in the RAM 17. When these data are written in for all of the machined works W loaded in the storage cells 6a and 7a, then the final step orders ending of the routine.

Figure 6:
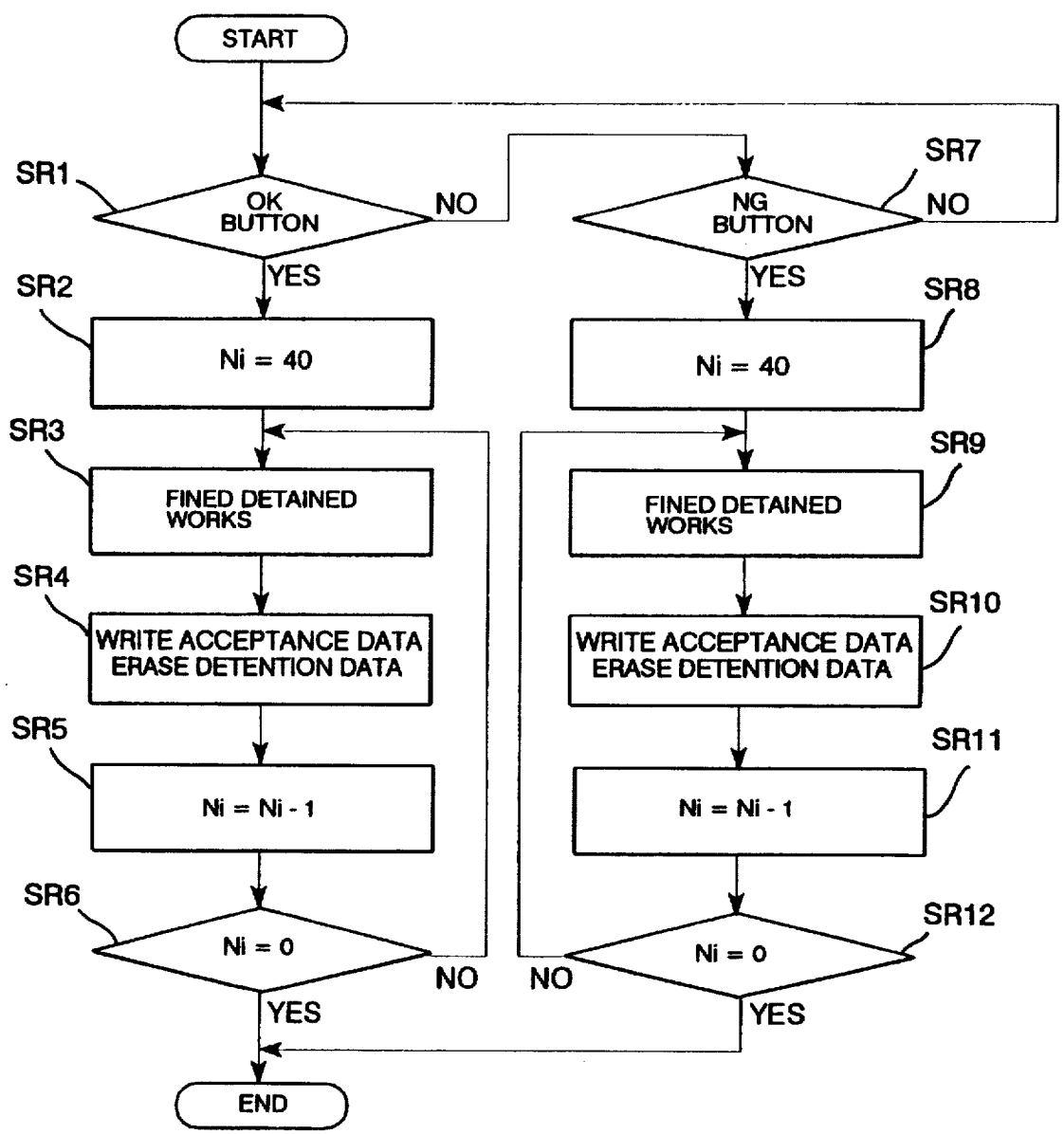
FIG. 6 is a flow chart illustrating a data write and erase routine for the microcomputer.

Referring to FIG. 6, which is a flow chart of the data write and erase routine for the data write and erase section 19 of the MC 14, the first functional block at step SR1 in FIG. 6 is to make a decision as to whether there has been provided a conformity instruction signal or whether the OK button of the control panel 9a has been pushed by an operator. If the answer to the decision is "YES," this indicates that a sampled machined work W has been inspected and judged to be in conformity with required accuracy or quality of machining and consequently, the OK button of the control panel 9a has been pushed, then, an operation repetition number Ni is set to the lot size of the conforming works W1, which is forty (40) in this instance, at step SR2. Subsequently, the detention data in the RAM 17 are searched so as to find all of the storage cells 6a and 7a loaded with the conforming works W which are detained from delivery at step SR3. Then, at step SR4, the data write and erase section 19 writes in the RAM 17 data of conformity of the machined work W loaded in each storage cell 6a or 7a found as a result of the detention data search so as to decide definitely that the machined work W is in conformity with the required accuracy or quality of machining and immediately thereafter, erases the detention data of the conforming work W1. After changing the operation repetition number Ni by a decrement of one (1) at step SR5, a decision is made at step SR6 as to whether the operation repetition number Ni has been changed to zero (0). If the answer to the decision is "NO," then, the routine is repeated through steps SR3–SR5 until the operation repetition number Ni reaches zero (0). However, if answer to the decision is "YES," this indicates that the definite data of conformity have been written in the RAM 17 for all of the machined works W of this lot were previously denoted that they should be detained from delivery, then, the final step orders ending of the routine.

On the other hand, if the answer to the decision made at step SR1 concerning whether there is provided a conformity instruction signal or whether the OK button of the control panel 9a is pushed by an operator is "NO," then, another decision is made at step SR7 as to whether there has been provided a defect instruction signal or whether the OK button of the control panel 9a has been pushed by the operator. If the answer to the decision is "YES," this indicates that the sampled machined work W has been judged to be defective and consequently, the NG button of the control panel 9a has been pushed, then, another operation repetition number Ni is set to the lot size of the conforming works W, namely forty (40) in this instance, at step SR8. Subsequently, the detention data in the RAM 17 are searched so as to find all of the storage cells 6a and 7a loaded with the subject works W which are detained from delivery at step SR9. Then, at step SR10, the data write and erase section 19 writes in the RAM 17 data of defect of the machined work W loaded in each storage cell 6a or 7a found from a result of the detention data search so as to decide definitely that the work W is defective and immediately thereafter, erases the detention data of the defective work W. After changing the operation repetition number Ni by a decrement of one (1) at step SR11, a final decision is made at step SR12 as to whether the operation repetition number Ni has reached zero (0). If the answer to the decision is "NO," then, the routine is repeated through steps SR9–SR11 until the operation repetition number Ni reaches zero (0). However, if answer to the decision is "YES," this indicates that the definite data of defect have been written in the RAM 17 for all of the machined works W having been denoted that they should be detained from delivery, then, the final step orders ending of the routine.

Figure 7:
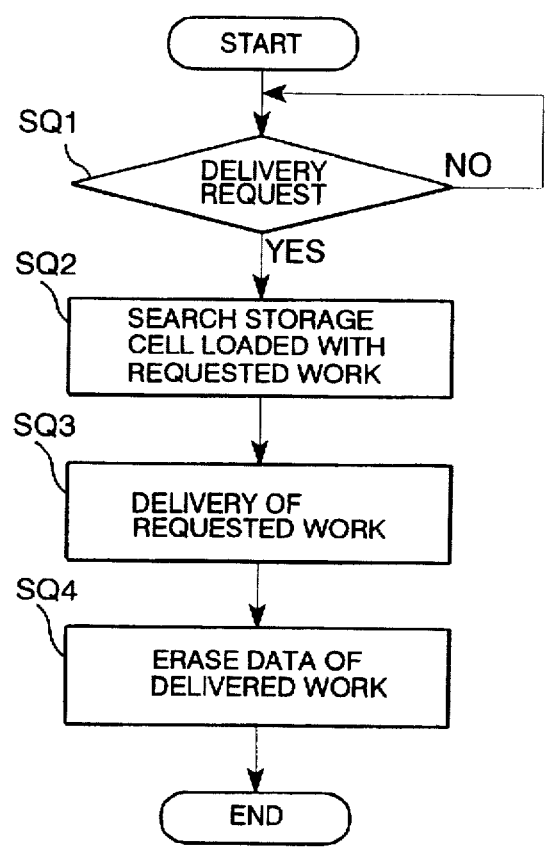
FIG. 7 is a flow chart illustrating a work delivery routine for the microcomputer.

Referring to FIG. 7, which is a flow chart of the work delivery routine for the work delivery command section 20 of the MC 14, the flow chart routine commences and control precedes directly to a decision block at step SQ 1 where a decision is made as to whether there is a request of delivery of a specific kind of machined work W from the assembling station 5. If the answer to the decision is "YES," then, at step SQ2, the work delivery command section 20 searches the location data of any one of the storage cells 6a and 7a which is loaded with a conforming work W1 whose kind is in conformity with the request from the assembling station 5. The work delivery command section 20 subsequently causes the work handling apparatus 8 to hold the subject machined work W1 and place it on the second transportation conveyer 2 at step SQ3. After having erased the data relating to the subject work W including the occupancy data, the kind of data and the machining quality data at step SQ4, the final step orders ending of the routine.

Figure 8:
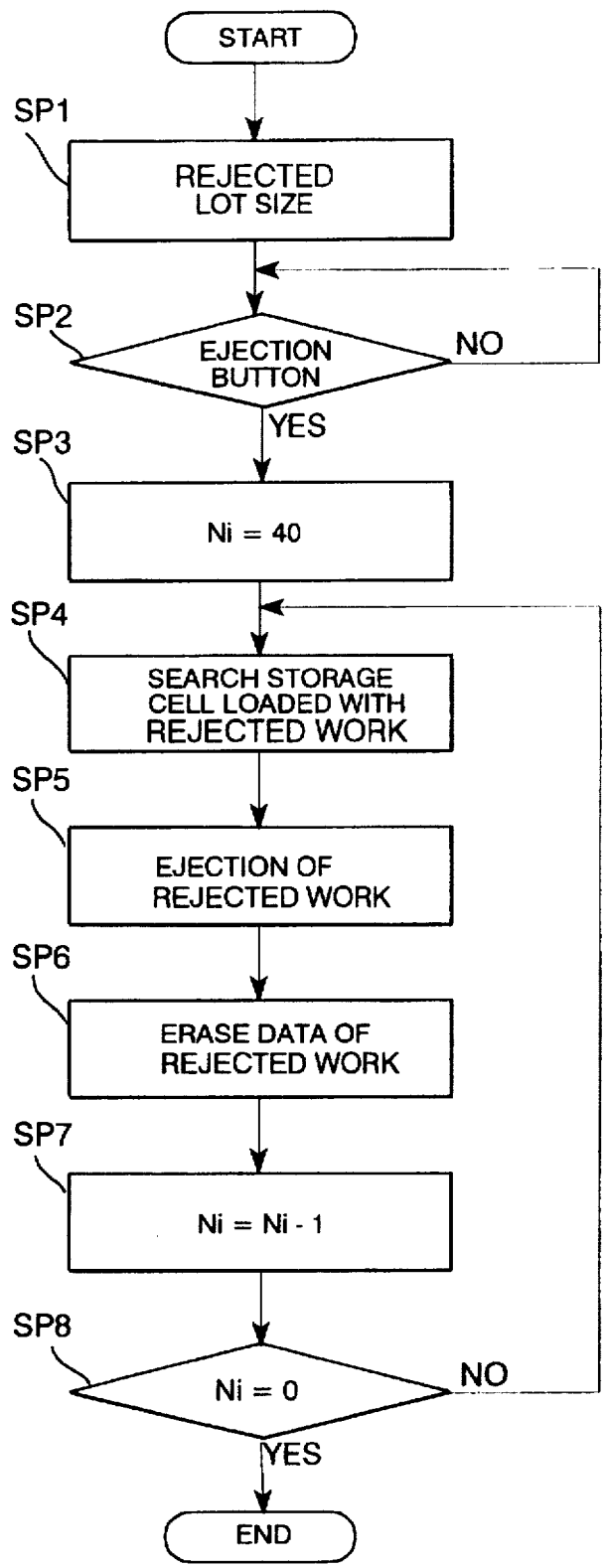
FIG. 8 is a flow chart illustrating a work ejection routine for the microcomputer.

Referring to FIG. 8, which is a flow chart of the work ejection routine for the work ejection command section 21 of the MC 14, the first functional block at step SP1 is to set a lot size of the defective works W2, which is fourth (40) in this instance. Thereafter, a decision is made at step SP2 as to whether there has been provided an ejection command signal or whether an ejection command button of the control panel 9a has been pushed by the operator. If the answer to the decision is "YES," then, after having set the operation repetition number Ni to the lot size of the subject defective works W2, which is fourth (40) in this instance, at step SP3, the work ejection command section 21 searches the location data of all of the storage cells 6a and 7a which have been loaded with the subject defective works W2 at step SP4. The work ejection command section 21 subsequently causes the work handling apparatus 8 to hold the subject defective works W2 and place them on the second transportation conveyer 2 one after another at step SP5. Thereafter, the data relating to the ejected defective works W1, including the occupancy data, the kind data and the machining quality data, at step SP6. After changing the operation repetition number Ni by a decrement of one (1) at step SP7, a final decision is made at step SP8 as to whether the operation repetition number Ni has reached zero (0). If the answer to the decision is "NO," then, the routine is repeated through steps SP4–SP7 until the operation repetition number Ni reaches zero (0). However, if answer to the decision is "YES," this indicates that the data have been erased from the RAM 17 for all of the ejected defective works W2, then, the final step orders ending of the routine.

With the storage management system in which data relating to every one of the storage cells 6a and 7a of the respective work stores 6 and 7 are renewed every time a machined work W is loaded in and taken out from the storage cell 6a or 7a, the work handling apparatus 8 delivers a machined work W of a specified kind in conformity with the request of delivery from the assembling station 5. Because all of machined works W involved in one lot having loaded in the storage cells 6a and 7a are left under detention until an inspection of a sampled machined work W of the lot is finished and the retention of delivery is released so as to render all of the machined works W of the lot ready to be delivered upon the completion of the inspection, it is certainly prevented to deliver any defective machined works W to the assembling station 5. This provides for the work transportation line an increase in working efficiency.

In place of writing the detention data in the RAM 17 in order to suspend or retain the delivery of machined works W of a lot before a sampling inspection is made for each lot, it may be done to constrainedly prohibit access of the work handling apparatus 8 to any machined works W of the lot even when there is any request of delivery of the machined work from the assembling station 5.

The storage management system is considerably improved in cooperation with a stock monitoring system optionally provided as shown in FIG. 1.

Referring back to FIG. 1, the stock monitoring system includes as a part of the storage management system a stock monitoring unit 100 at the work depot station 4, a work sensor 101 and an order rearrangement instruction unit 102. The stock monitoring unit 100 has stock data for each kind of machined works W, such as a size or number of stock A of machined works W in the work depot station 4, an upper stock limitation B of the machined works W, a lower stock limitation C of the machined works W, and the delivered number D per hour of the machined works W. The upper stock limitations B and the lower stock limitations C are predetermined according to kinds of works, respectively. The work sensor 101 is disposed immediately after the machining station 3 and provides for the stock monitoring unit 100 a signal every time it detects a machined work W loaded on or supplied to the first transportation conveyer 1 from the machining station 3. The order rearrangement instruction unit 102 has a selection switch, a confirmation instruction button and a selection instruction lamp (all of these elements are not shown). Through this order rearrangement instruction unit 102 a selection signal indicative of a work kind is sent to both the machining station 3 and the work depot station 4. The order rearrangement instruction unit 102 includes three data files, such as a subsequent loading order data file F1, an interrupt loading order data file F2, and a definite loading order data file F3 shown in FIGS. 9A, 9B and 9C, respectively. Describing in more detail, the subsequent loading order data file F1 contains data of the basic order of loading of various kinds of machined works W onto the first transportation conveyer 1 from the machining station 3. The basic loading order is indicated by pointer numbers (PNs). For instance, the subsequent loading order data file F1 indicates that machined works W of each lot are loaded onto the first transportation conveyer 1 in order of WB, WD, WA, WC . . . The interrupt loading order data file F2 contains data of the order of interrupt loading of machined works W which are called for whenever there is a shortage of some kinds of machined works W in the work depot station 4 so as to suspend loading of a succeeding lot of machined works W in the basic order and give preference of interrupt loading of specified kinds of machined works which are in need of urgent supply to the assembling station 5. In this instance, the interrupt loading data file F2 indicates that machined works W of each lot are loaded on or supplied to the first transportation conveyer 1 in order of WE and WG prior to loading of a succeeding lot of machined works WB, WD, WA, WC, . . . The definite loading order data file F3 contains data of the definite order in which machined works W have been loaded on the first transportation conveyer 1 and are being transported toward the work depot station 4. For instance, the definite loading order data file F3 indicates that machined works W have been placed in the order of WF, WH, WI, . . .

With the work transportation line shown in FIG. 1, various kinds of material works W of a first lot, having a size of, for instance in this embodiment, forty (40), are machined one after another at the machining station 3 and transported by the first transportation conveyer 1 toward the work depot station 4. While the machined works W are transported toward the work depot station 4, the work sensor 101 detects each machined work W and provides for the stock monitoring unit 100 a signal. These machined works W are brought into the work stores 6 and 7 and loaded in empty storage cells 6a and 7a by the work handling apparatus 8. Every time one machined work W is loaded in one of the empty storage cells 6a and 7a, the stock monitoring unit 100 changes the number of stock A of machined works W in the work stores 6 and 7 by an increment of one (1). This change in the number of stock A is made for every work kind. Basically, machined works W are loaded on or supplied to the first transportation conveyer 1 and transported toward the work depot station 4 in the loading order indicated by the subsequent loading order data file F1. However, whenever the order of interrupt loading of machined works W is written in the interrupt loading order data file F2, after having finished on-going loading of machined works W in the basic loading order, machined works W are loaded on or supplied to the first transportation conveyer 1 in the loading order indicated by the interrupt loading data file F2 prior to loading of a succeeding lot of machined works W in the basic loading order. All of the machined works W transported by the first transportation conveyer 1 are brought into empty storage cells 6a and 7a.

When there is issued a request of delivery for a specific kind of a machined work W to the assembling station 5, a work delivery command signal is provided so as to cause the work handling apparatus 8 to search and withdraw a machined work W1 of the subject kind in conforming with the request, and loads the second transportation conveyer 2 with the specified kind of machined work W1. The work sensor 101 detects each machined work W loaded onto the second transportation conveyer 2 so as to count and rewrite the delivered number D of machined works W per hour.

The operation of the storage management system for the work transportation line with the stock monitoring system is best understood by reviewing FIGS. 10A-10F, 11A-11B and 12 which are flow charts illustrating a storage monitoring maine routine and subroutines for the MC 14 of the control unit 15. The following description is given to, for instance, the case where there are ten kinds of machined works WA-WJ contained in a lot whose lot size is forty (40) and the first transportation conveyer 1 can be loaded with sixty (60) machined works from the machining station 3.

Figure 10C:
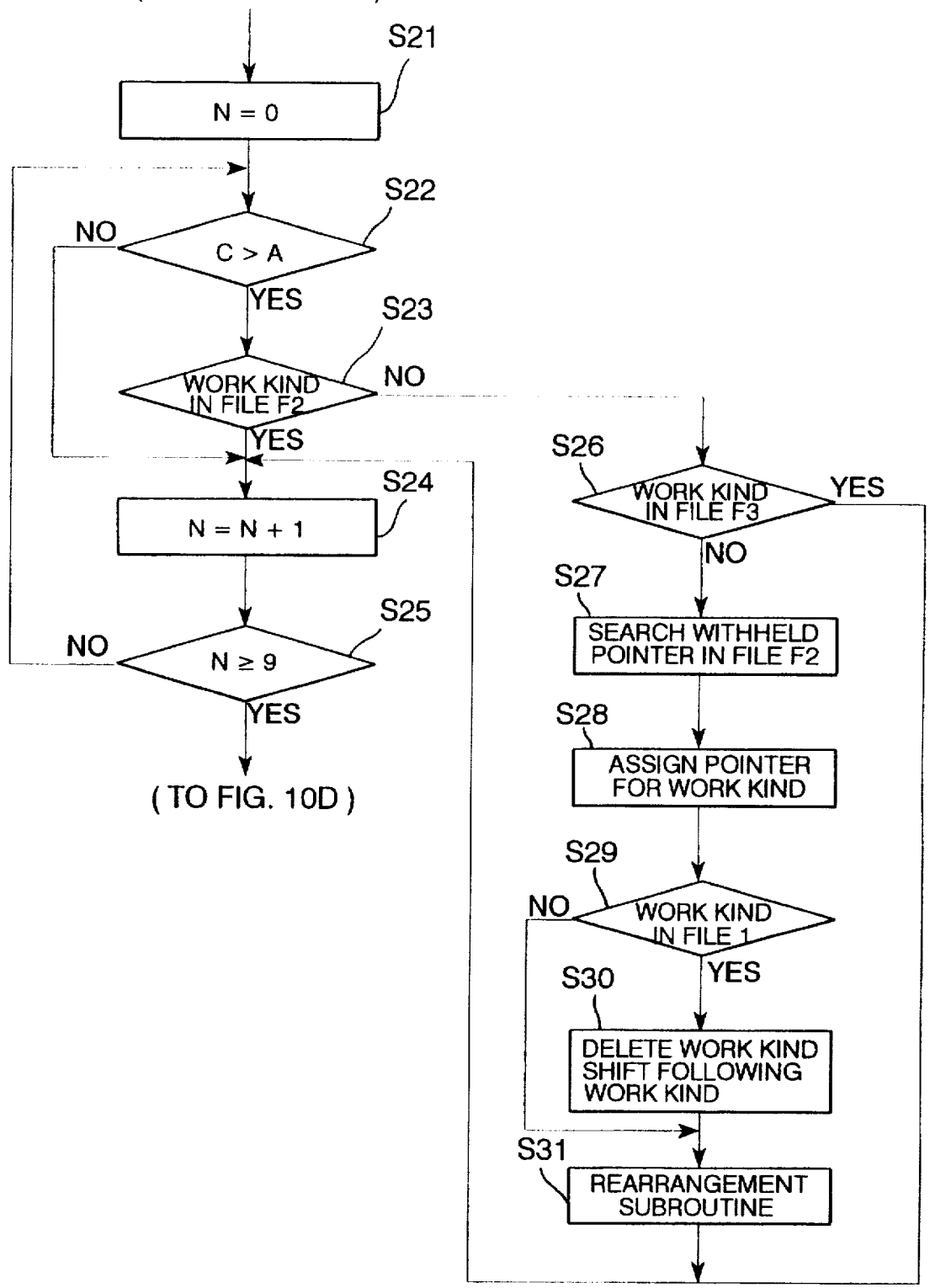

Referring to FIGS. 10A-10F, which is a flow chart of the storage monitoring main routine, the flow chart routine commences in FIG. 10A and control passes directly to a function block Si where a work index number N is set zero (0) so as to specify the kind of machined works WA. Ten kinds of works WA-WJ are specified by single digit work index numbers 0-9, respectively. Thereafter, a decision is made with respect to machined works WA whose work index number N is zero (0) at step S2 as to whether the number of stock A is smaller than a total number of the lower stock limitation C and the delivered number D. In other words, what is judged at step S2 is whether there is a sufficient stock of the subject kind (N=0) of machined works WA in the work depot station 4. If the answer to the decision is "NO," this indicates that the work depot station 4 has a sufficient stock of the subject kind (N =0) of machined works WA, then, after having changed the work index number N by an increment of one (1) at step S4, a decision is made at step S5 as to whether the work index number N is equal to or greater than nine (9), i.e. whether the decision as to whether the number of stock A is smaller than a total number of the lower stock limitation C and the delivered number D has been made for all kinds of machined works WA-WJ. If the answer to the decision made at step S2 is "YES," this indicates that the work depot station 4 has a shortage of stock of a specified kind of machined works W, then, a decision is subsequently made at step S3 as to whether the subsequent loading order data file F1 contains the subject work kind in the basic loading order, i.e. whether the subject kind of machined works W which have been judged to be in short supply are scheduled to be supplied. If the answer to the decision made at step S3 is "YES," after having changed the work index number N by an increment of one (1) at step S4, the decision concerning the largest work index number N of nine (9) is made at step S5. The "YES" answer indicates that all kinds of machined works W are scheduled to be supplied.

If the answer to the decision concerning the subsequent loading order data file F1 made at step S3 is "NO," this indicates that the subject kind of machined works W in short supply are not scheduled to be supplied, then, a decision is subsequently made at step S6 as to whether the interrupt loading order data file F2 contains the subject work kind, i.e. whether the subject kind of machined works W having been judged to be in short supply are expected to be imminently supplied. If the answer to the decision is "YES," this indicates that the subject kind of machined works W having been judged to be in short supply are expected to be supplied as supplementary stock after the completion of the ongoing loading of machined works W in the basic loading order, then, the work index number N is changed by an increment of one (1) so as to specify another work kind at step S4. By repeating these steps S2-S6, decisions are made as to whether the work depot station 4 has a shortage of stock of any kind of machined works W and, if in fact there is a shortage of stock of any kind of machined works W, whether machined works W in short supply are scheduled or expected to be supplied.

On the other hand, if the answer to the decision made at step S6 is "NO," this indicates that the subject kind of machined works W in short supply are not expected to be supplied, then, a decision is further made at step S7 as to whether the definite loading order data file F3 contains the subject work kind in the definite loading order. If the answer to the decision is "YES," this indicates that the subject kind of machined works W having been judged to be in short supply are scheduled to be definitely supplied as a supplementary stock, then, the work index number N is changed by an increment of one (1) so as to specify still another work kind at step S4.

On the other hand, if the answer to the decision is "NO," this indicates that the subject kind of machined works W having been judged to be in short supply in the work depot station 4 are not scheduled nor expected to be supplied into the work depot station 4, then, the subsequent loading order data file F1 is searched to find withheld pointers (PNs) at step S8 and the foremost withheld pointer is assigned for the subject work kind at step S9. As a result, the subject kind is integrated into the basic loading order for a succeeding lot of machined works W. Subsequently, an order rearrangement subroutine illustrated in 11A and 11B is called for at step S10.

Figure 11A:
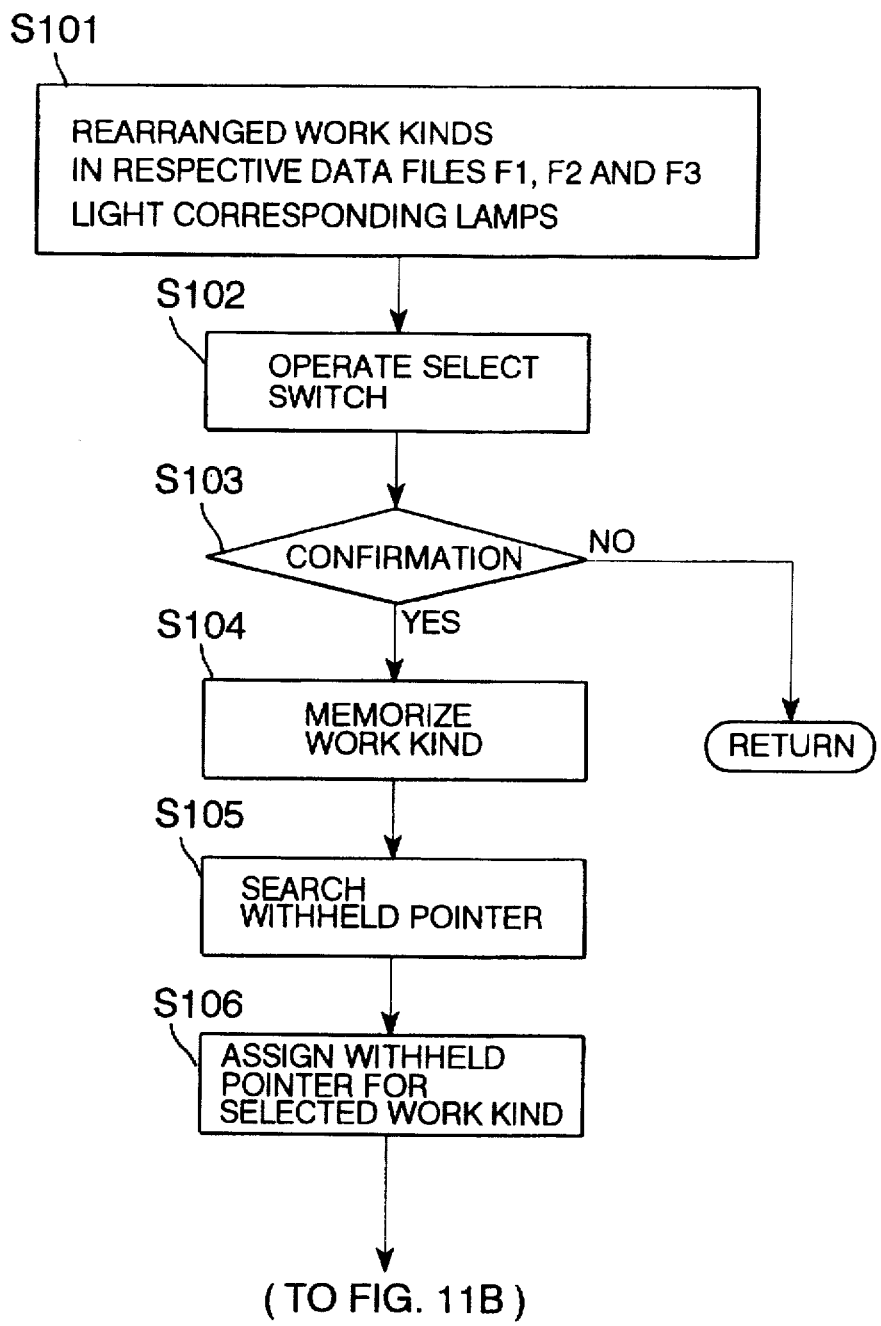
FIGS. 11A and 11B are a flow chart illustrating an order rearrangement subroutine for the microcomputer.
Figure 11B:
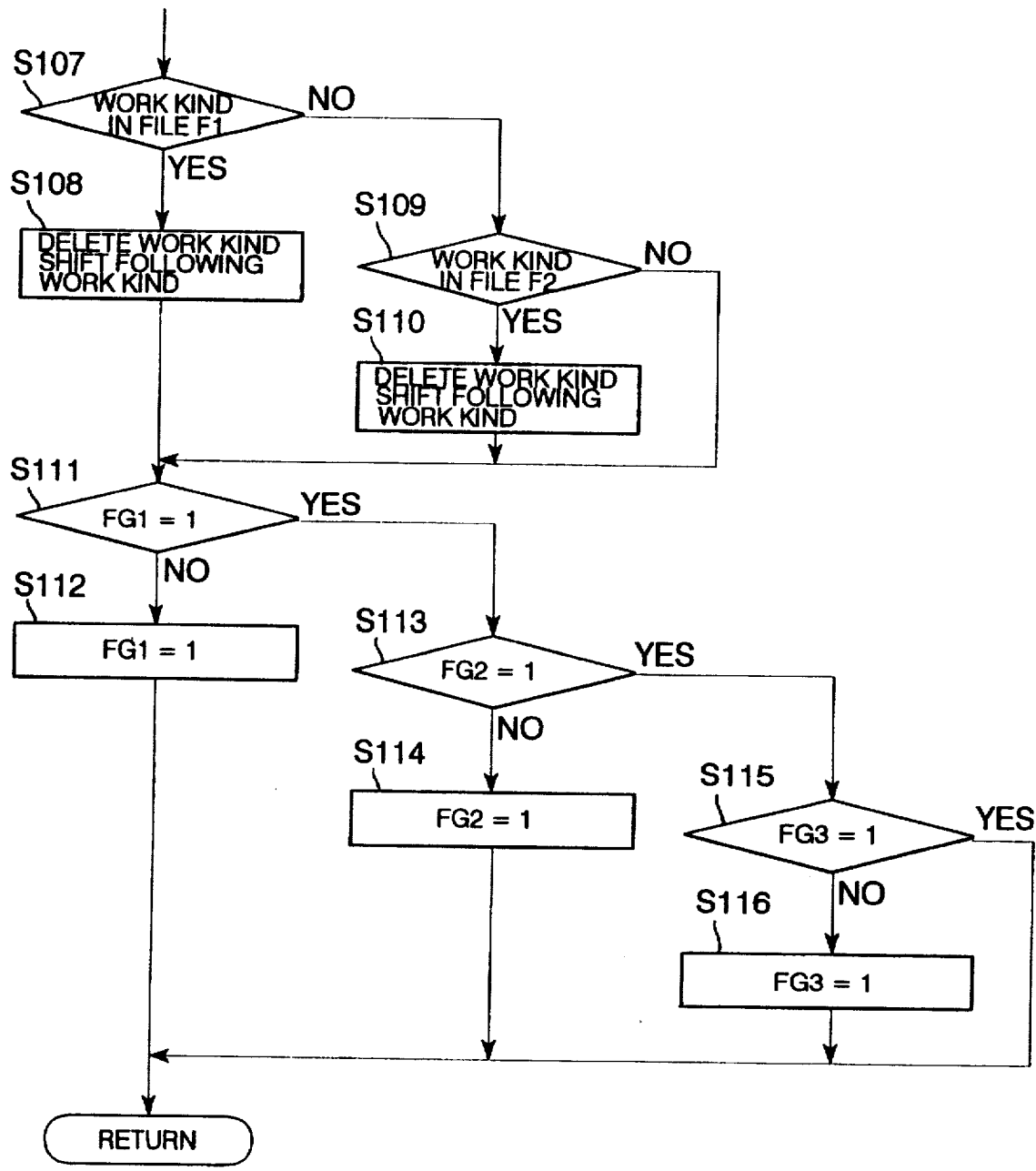

Referring to FIGS. 11A and 11B, which is a flow chart of the order rearrangement subroutine, the first step at step 101 in FIG. 11A is to assign the pointers (PNs) of zero (0) of the respective data files F1, F2 and F3 for an regular work kind for basic loading, an urgent work kind and a definite work kind, respectively, and light the corresponding order rearrangement instruction lamps of the order rearrangement instruction unit 102. Thereafter, at step S102, the operator operates the work kind selection switch of the order rearrangement instruction unit 102 so as to select work kinds for order rearrangement. When the operator pushes the check button in confirmation of order rearrangement at step S103, the selected work kinds are memorized at step S104. However, if the operator does not push the check button, the step orders return to the main routine, after the step in the main routine calling for the order rearrangement subroutine.

Subsequently, the definite loading order data file F3 is searched to find withheld pointers (PNs) at step S105, and the withheld pointers are assigned for the selected work kinds at step S106.

Thereafter, a decision is made at step S107 as to whether the subsequent loading order data file F1 contains the subject work kind in the basic loading order, i.e. whether the subsequent loading order data file F1 contains a work kind identical with any work kind in the definite loading order written the definite loading order data file F3. If the answer to the decision is "YES," then, at step S108, the identical work kind is deleted from the subsequent loading order data file F1 and the unoccupied pointer (PN) is assigned for a work kind in the following place. In other words, the identical work kind is prevented from being doubled in the basic loading order so as not to load the work depot station 4 with the identical kind of machined works W in excess. On the other hand, if the answer to the decision is "NO," then, a decision is subsequently made at step S109 as to whether the interrupt loading order data file F2 contains a work kind identical with any kind in the loading order written the definite loading order data file F3, i.e. whether the interrupt loading order data file F2 contains a work kind identical with any work kind in the loading order written in the definite loading order data file F3. If the answer to the decision is "YES," then, at step S110, the identical work kind is deleted from the interrupt loading order data file F2 and the unoccupied pointer (PN) is assigned for a work kind in the following place. In other words, the identical work kind is prevented from being doubled in the interrupt loading order so as not to load the work depot station 4 with the identical work kind of machined works W in excess.

After having rearranged loading order data in the loading order data file F1 or F2, a decision is made at step S111 as to whether a first rearrangement flag FG1 has been set to a state of one (1). If the first rearrangement flag FG1 has not yet been set to the state of one (1) or the answer to the decision is "NO," then, after having setting the first rearrangement flag FG1 to the state of one (1) at step S112, the final step orders return to the main routine, after the step in the main routine calling for the order rearrangement subroutine. If the first rearrangement flag FG1 has been set to the state of one (1) or the answer to the decision is "YES" then, a decision is made at step S113 as to whether a second rearrangement flag FG2 has been set to a state of one (1). If the second rearrangement flag FG2 has not yet been set to the state of one (1) or the answer to the decision is "NO," then, after having setting the second rearrangement flag FG2 to the state of one (1) at step S114, the final step orders return to the main routine, after the step in the main routine calling for the order rearrangement subroutine. If the second rearrangement flag FG2 has been set to the state of one (1) or the answer to the decision is "YES" then, a decision is made at step S115 as to whether a third rearrangement flag FG3 has been set to a state of one (1). If the third rearrangement flag FG3 has not yet been set to the state of one (1) or the answer to the decision is "NO," then, after having setting the third rearrangement flag FG3 to the state of one (1) at step S116, the final step orders return to the main routine, after the step in the main routine calling for the order rearrangement subroutine. Otherwise, if the answer to the decision is "YES," then, the order rearrangement subroutine returns directly to the main routine, after the step in the main routine calling for the order rearrangement subroutine.

In such a way, the first to third rearrangement flags FG1, FG2 and FG3 are set to the state of one (1) in which they are enabled to count machined works W, whose work kind are contained in the respective loading order data files F1, F2 and F3, loaded onto the first transportation conveyer 1.

Referring to FIG. 10B, when the answer to the decision made at step S5 is "YES," this indicates that all kinds of machined works W are scheduled to be supplied, then, the work index number N is set zero (0) so as to specify the machined works WA at step S11. Thereafter, a decision is made with respect to machined works WA whose work index number N is zero (0) at step S12 as to whether the number of stock A is smaller than the upper stock limitation B. If the answer to the decision is "NO," this indicates that the work depot station 4 has a stock of the subject kind (N=0) of machined works WA definitely larger than the upper stock limitation B, then, after having changed the work index number N by an increment of one (1) at step S14, a decision is further made at step S15 as to whether the work index number N is equal to or greater than nine (9), i.e. whether the decision regarding the number of stock A with respect to the upper stock limitation B has been made for all kinds of machined works WA–WJ. If the answer to the decision made at step S12 is "YES," this indicates that the work depot station 4 has a stock of the subject kind of machined works less than the upper stock limitation B, then, a decision is subsequently made at step S13 as to whether the subsequent loading order data file F1 contains the subject work kind in the basic loading order, i.e. whether the subject kind of machined works W having been judged to be in short supply with respect to the upper stock limitation B are scheduled to be supplied. If the answer to the decision made at step S13 is "YES," after having changed the work index number N by an increment of one (1) so as to specify another work kind at step S14, the decision concerning the work index number N is made at step S15. The "YES" answer indicates that all kinds of machined works W are scheduled to be supplied.

If the answer to the decision concerning the subsequent loading order data file F1 made at step S13 is "NO," this indicates that a specific kind of machined works W, which are in short supply with respect to the upper stock limitation B, are not scheduled to be supplied, then, a decision is subsequently made at step S16 as to whether the interrupt loading order data file F2 contains the subject kind, i.e. whether the subject kind of machined works W having been judged to be in short supply with respect to the upper stock limitation B are imminently expected to be supplied. If the answer to the decision is "YES," this indicates that the subject kind of machined works W having been judged to be in short supply are imminently expected to be supplied for supplementary stock after the completion of the on-going loading of machined works W in the basic loading order, then, the work index number N is changed by an increment of one (1) so as to specify another work kind at step S14. By repeating these steps S12–S16, decisions are made for all work kinds as to whether the work depot station 4 has a shortage of stock of the respective kinds of machined works W with respect to the upper stock limitation B and, if in fact there is a shortage of stock of any kind of machined works W with respect to the upper stock limitation B in the work depot station 4, whether the subject kind of machined works W in short supply are scheduled or expected to be supplied.

On the other hand, if the answer to the decision made at step S16 is "NO," this indicates that the subject kind of machined works W in short supply with respect to the upper stock limitation B are not expected to be supplied, then, a decision is further made at step S17 as to whether the definite loading order data file F3 contains the subject work kind in the definite loading order. If the answer to the decision is "YES," this indicates that the subject kind of machined works W having been judged to be in short supply with respect to the upper stock limitation B are definitely scheduled to be supplied for supplementary stock, then, the work index number N is changed by an increment of one (1) so as to specify another kind of machined works W at step S14.

On the other hand, if the answer to the decision is "NO," this indicates that the subject kind of machined works W having been judged to be in short supply in the work depot station 4 are not scheduled nor expected to be supplied to the work depot station 4, then, the subsequent loading order data file F1 is searched to find withheld pointers (PNs) at step S18 and the foremost withheld pointer is assigned for the subject work kind at step S19. As a result, the subject work kind is integrated into the basic loading order for a succeeding lot of machined works. Subsequently, the order rearrangement subroutine illustrated in 11A and 11B is called for at step S20.

Referring to FIG. 10C, after the order rearrangement subroutine has taken place, and when the answer to the decision made at step S15 is "YES," this indicates that all kinds of machined works W are scheduled to be supplied up to the upper stock limitation B, then, the work index number N is set zero (0) again so as to specify the kind of machined works WA at step S21. Thereafter, a decision is made with respect to machined works WA having the work index number N of zero (0) at step S22 as to whether the number of stock A is smaller than the lower stock limitation C. If the answer to the decision is "NO," this indicates that the work depot station 4 has a stock of the subject kind (N=0) of machined works WA definitely larger than the lower stock limitation C, then, after having changed the work index number N by an increment of one (1) at step S24, a decision is made at step S25 as to whether the work index number N is equal to or greater than nine (9), i.e. whether the decision regarding the number of stock A with respect to the lower stock limitation B has been made for all kinds of machined works WA-WJ.

On the other hand, if the answer to the decision made at step S22 is "YES," this indicates that the work depot station 4 has a stock of the subject kind (N=0) of machined works WA smaller than the lower stock limitation C, then, a decision is subsequently made at step S23 as to whether the interrupt loading order data file F1 contains the subject kind (N=0) in the interrupt loading order, i.e. whether the subject kind of machined works W in short supply with respect to the lower stock limitation C are expected to be supplied. If the answer to the decision made at step S23 is "YES," after having changed the work index number N by an increment of one (1) so as to specify another kind of machined works W at step S24, the decision concerning the work index number N is made at step S25. The "YES" answer indicates that all kinds of machined works W are scheduled to be supplied.

If the answer to the decision concerning the subsequent loading order data file F2 made at step S23 is "NO," this indicates that the subject kind of machined works W, which are in short supply with respect to the lower stock limitation C, are not expected to be supplied, then, a decision is further made at step S26 as to whether the definite loading order data file F3 contains the subject work kind in the definite loading order. If the answer to the decision is "YES," this indicates that the subject kind of machined works W in short supply with respect to the lower stock limitation C are definitely scheduled to be supplied for supplementary stock, then, the work index number N is changed by an increment of one (1) so as to specify another work kind at step S24. By means of the repetition of procedure, decisions are made for all work kinds in a relatively short period of time as to whether the work depot station 4 has a shortage of stock of the respective kinds of machined works W with respect to the lower stock limitations C and, if there is any shortage of stock of machined works W with respect to the lower stock limitation C in the work depot station 4, whether the kind of machined works W in short supply are scheduled or expected to be supplied.

If the answer to the decision made at step S26 is "NO," this indicates that the subject kind of machined works W in short supply with respect to the lower stock limitation C are not expected to be supplied, then, the interrupt loading order data file F2 is searched to find withheld pointers (PNs) at step S27 and the foremost withheld pointer is assigned for the subject kind at step S28. As a result, the subject kind is integrated into the interrupt loading order and after having finished on-going loading of machined works W, the subject kind of machined works W are placed on or supplied to the first transportation conveyer 1 in the order indicated by the interrupt loading data file F2 prior to loading of a succeeding lot of machined works W.

Subsequently, at step S29, a decision is made as to whether the subsequent loading order data file F1 contains a work kind identical with the subject work kind added to the basic loading order of the interrupt loading data file F2. If the answer to the decision is "YES," then, at step S30, the identical work kind is deleted from the subsequent loading order data file F1 and the withheld pointer (PN) is assigned for the work kind in a following place. In other words, the identical work kind is prevented from being doubled in the basic loading order so as to prevent the work depot station 4 from being loaded with the identified kind of machined works W in excess. Thereafter, or if the answer to the decision made at step S29 is "NO," the order rearrangement subroutine is called for at step S31.

Figure 10D:
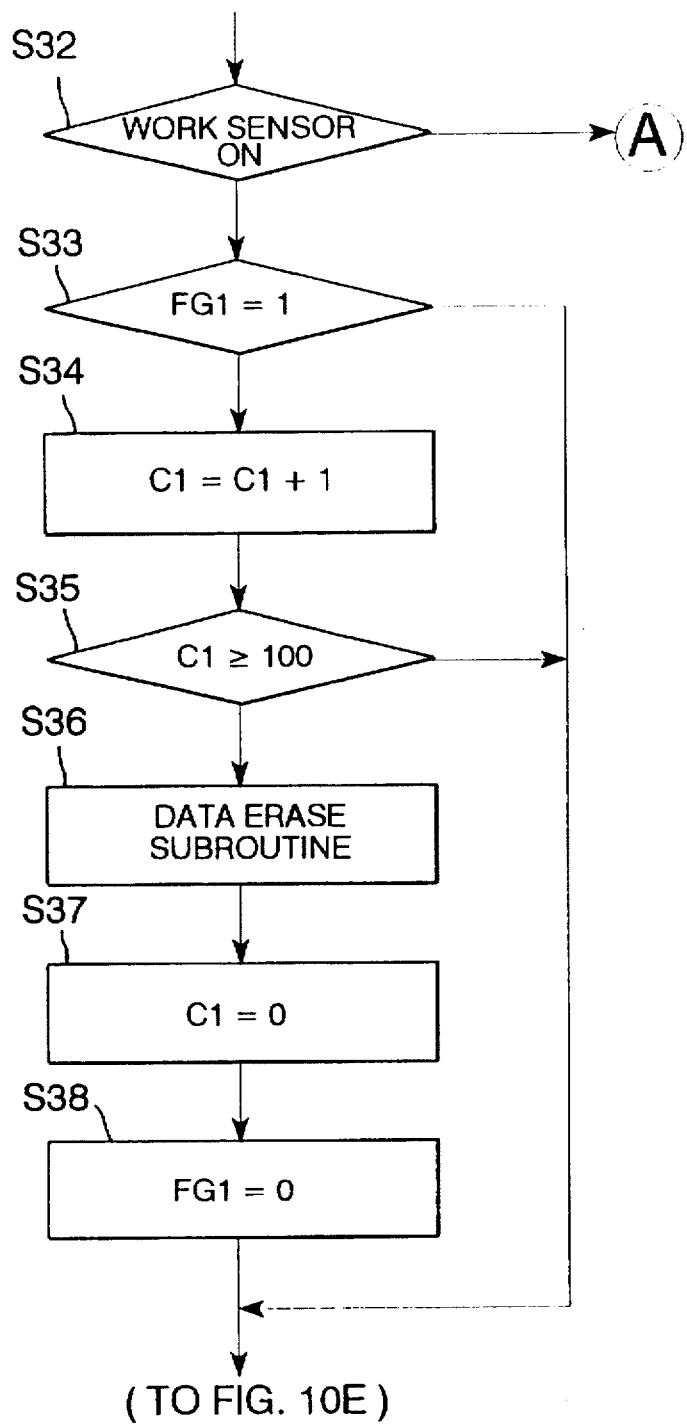

Referring to FIG. 10D, after the termination of the order rearrangement subroutine, when the answer to the decision made at step S25, concerning the work index number N with respect to the lower stock limitation B for all work kinds of machined works WA-WJ, is "YES," then, a decision is made at step S32 as to whether the work sensor 101 is ready to detect machined works W. When the work sensor 101 is ready, a decision is made at step S33 as to whether the first rearrangement flag FG1 has been set to the state of one (1) in the order rearrangement subroutine. If the first rearrangement flag FG1 has been set to the state of one (1), after having changed the count C1 of a first counter by an increment of one (1) at step S34, a decision is made at step S35 as to whether the first counter has counted 100 or more than 100 machined works W. The first counter counts one (1) when the first transportation conveyer 1 is loaded with the first machined work W of a first lot of forty machined works W and counts up to fourth for the first entire lot. Because the first transportation conveyer 1 can be loaded with up to sixty (60) machined works W one after another, the first lot of forty machine works W enter entirely into the work depot station 4 when there have loaded the first transportation conveyer 1 with sixty machined works W including an entire second lot of machined works W and a part of a third lot of machined works W. That is, when the first counter counts 100 starting from the first machined work of the first lot, it is judged that the first lot of machined works W have entirely entered into the work depot station 4.

Figure 12:
FIG. 12 is a flow chart illustrating a data erase subroutine for the microcomputer.
Figure 12:
Figure 12:

If the answer to the decision concerning the entry of the entire lot of machined works W made at step S35 is "YES," a data erase subroutine illustrated in FIG. 12 is called for at step S36.

Referring to FIG. 12, which is a flow chart of the data erase subroutine, the first step at step S201 in FIG. 12 is to erase a work kind in the first place of the definite loading order, i.e. for which the pointer of zero (0) is assigned, in the definite loading order data file F3. For instance, the work kind WA, for which the pointer of zero (0) is previously assigned as shown in FIG. 13A, is deleted as shown in FIG. 13B. Thereafter, at step S202, a work kind WD for which the second pointer of two (1) is previously assigned is shifted up to the higher pointer of zero (0). In this manner, the remaining work kinds are shifted up one place to their higher pointers as shown in FIG. 13C. The final step orders return to the main routine, after the step in the main routine calling for the data erase subroutine.

Referring back to FIG. 10D, after resetting the first counter to zero (0) at step S37, the first rearrangement flag FG1 is reset to the state of zero (1) at step S38.

Figure 10E:
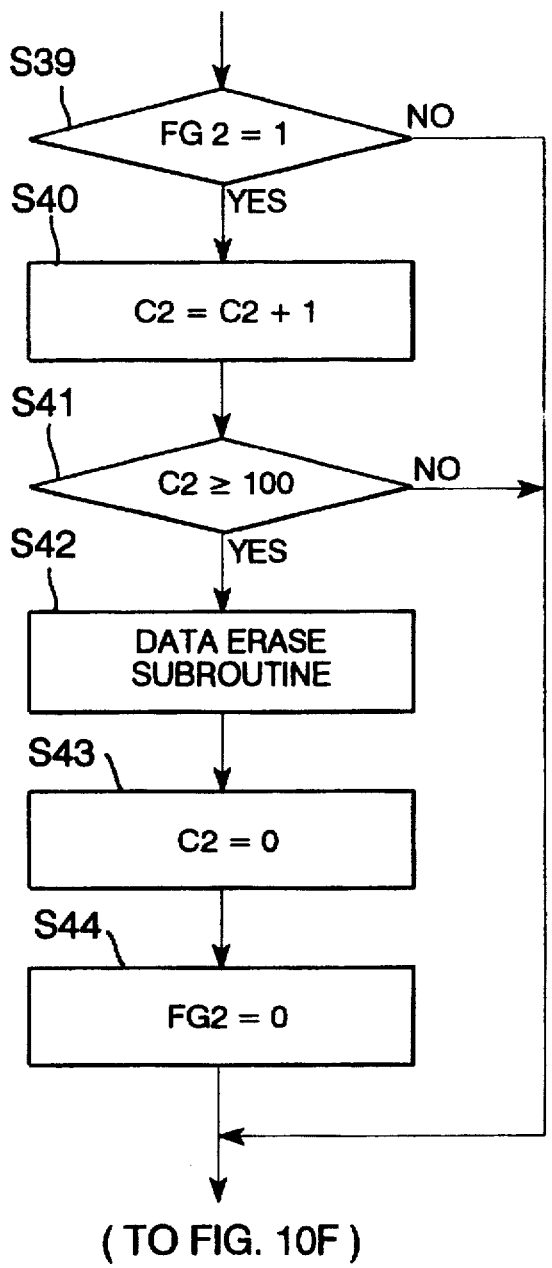

Referring to FIG. 10E, subsequent to the resetting of the first rearrangement flag FG1 to the state of zero (0) at step S38, or if the answer to the decision concerning the state of one (1) of the first rearrangement flag FG1 made at step S33 or to the decision concerning the 100 or more count of the first counter made at step S35 is "NO," a decision is made at step S39 as to whether the second rearrangement flag FG2 has been set to the state of one (1) in the order rearrangement subroutine. If the second rearrangement flag FG2 has been set to the state of one (1), after having changed the count C2 of a second counter by an increment of one (1) at step S40, a decision is made at step S41 as to whether the second counter has counted 100 or more than 100 machined works W. The second counter counts one (1) whenever the first transportation conveyer 1 is loaded with the first machined work W of any lot machined works W whose lot size is forty (40) and counts up fourth (40) for the entire lot. When the second counter counts 100 from the first count, it is judged that the entire lot of machined works W have entered into the work depot station 4.

If the answer to the decision concerning the entry of the entire lot of machined works W made at step S41 is "YES," the data erase subroutine illustrated in FIG. 12 is called for at step S42. The termination of the data erase subroutine orders return to the main routine, after the step in the main routine calling for the data erase subroutine.

When returning back to the main routine, after resetting the second counter to zero (0) at step S43, the second rearrangement flag FG2 is reset to the state of zero (0) at step S44.

Figure 10F:
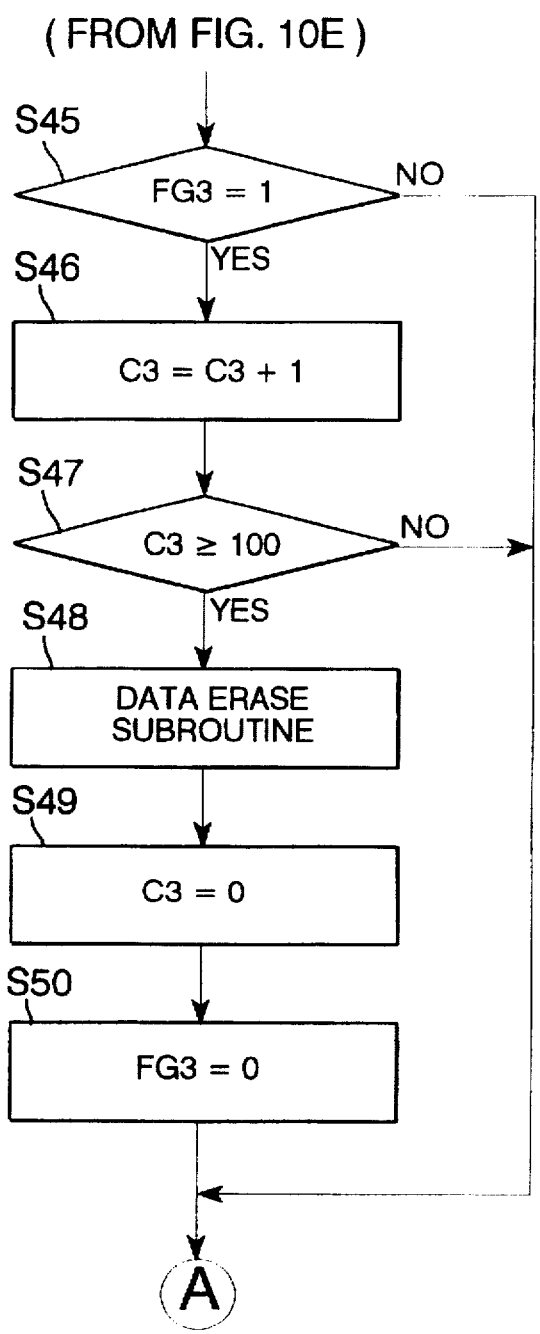

Referring to FIG. 10F, subsequent to the resetting of the second rearrangement flag FG2 to the state of zero (0) at step S44, or if the answer to the decision concerning the state of one (1) of the second rearrangement flag FG2 made at step S39 or to the decision concerning the 100 or more count of the second counter made at step S41 is "NO," a decision is made at step S45 as to whether the third rearrangement flag FG3 has been set to the state of one (1) in the data rearrangement subroutine. If the third rearrangement flag FG3 has been set to the state of one (1), after having changed the count C3 of a third counter by an increment of one (1) at step S46, a decision is made at step S47 as to whether the third counter has counted 100 or more than 100 machined works W. The third counter also counts one (1) when the first transportation conveyer 1 is loaded with the first one of a lot of machined works W whose lot size is forty (40) and counts up fourth (40) for the entire lot. When the third counter counts 100 from the first count, it is judged that the entire lot of machined works W have entered into the work depot station 4.

If the answer to the decision concerning the entry of the entire lot of machined works W made at step S47 is "YES," the data erase subroutine is called for at step S48. The termination of the final step of the data erase subroutine orders return to the main routine, after the step in the main routine calling for the data erase subroutine.

When returning back to the main routine, after resetting the third counter to zero (0) at step S49, the third rearrangement flag FG3 is reset to the state of zero (0) at step S50. Subsequent to the resetting of the third rearrangement flag FG3 to the state of zero (0) at step S50, or if the answer to the decision concerning the state of one (1) of the third rearrangement flag FG3 made at step S45 or to the decision concerning the 100 or more count of the third counter made at step S47 is "NO," the main routine is repeated from the first step.

With the storage management system of the present invention, the respective data files F1–F3 are rewritten according to states of stock of machined works W in the work depot station 4 so as to load the work depot station 4 with machined works of any desired kind which is in shot supply prior to other kinds of machined works W. In other words, any one of the data files contains data of a specific kind of machined works when the difference between the number of stock A of the specific kind of machined works and the lower stock limitation C is smaller than the delivered number D of the specific kind of machined works W per hour or when the number of stock A of the specific kind of machined works is smaller than the upper stock limitation B so as to load the work depot station 4 with the specific kind of machined works in course of time. On the other hand, either one of the interrupt loading data file F2 and the definite loading data file F3 contains data of a specific kind of machined works W when the number of stock A of the specific kind of machined works is smaller than the lower stock limitation C so as to load imminently the work depot station 4 with the specific kind of machined works. The data of the preferential work kind is deleted from any one of the data files F1–F3, so as to prevent an excessive stock of the preferential kind of machined works in the work depot station 4. Accordingly, the work depot station 4 is supplied with an appropriate size of stock of various kinds of machined works which are neither too much nor too little, avoiding that the work transportation line is stopped due to a shortage of any kind of machined works in the work depot station 4 and consequently, providing an increased working efficiency. Furthermore, a plurality of kinds of machined works are stored approximately equally in number in the work depot station 4.

Figure 14:
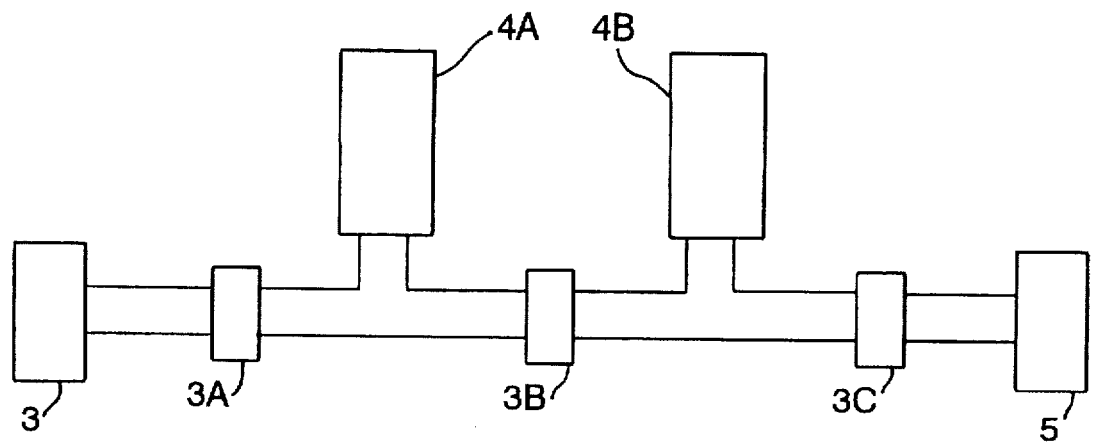
FIG. 14 is a schematic illustration of a modification of the work transportation line incorporating a storage management system in accordance with a preferred embodiment of the present invention.
Figure 15:
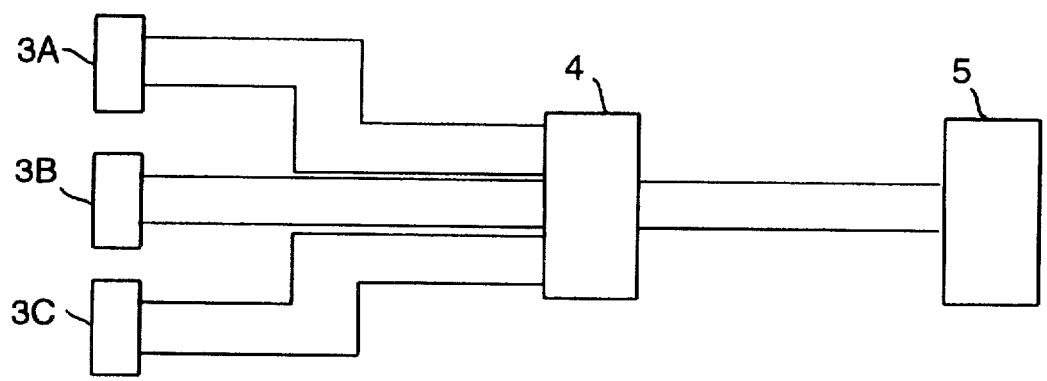
FIG. 15 is a schematic illustration of another modification of the work transportation line incorporating a storage management system in accordance with a preferred embodiment of the present invention.
Figure 16:
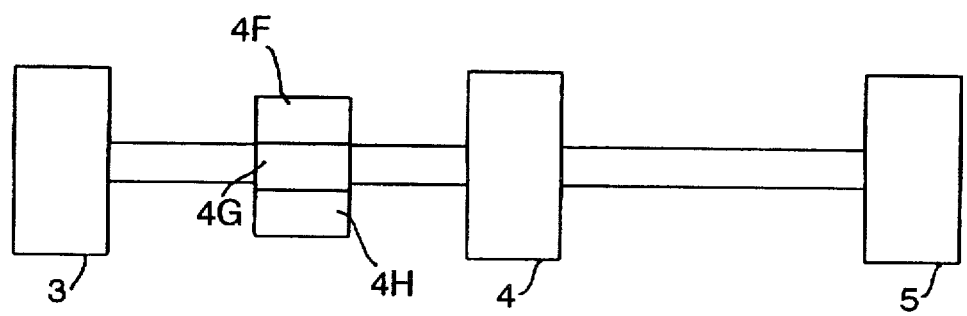
FIG. 16 is a schematic illustration of still another modification of the work transportation line incorporating a storage management system in accordance with a preferred embodiment of the present invention.

The work transportation line with the storage management system may be laid out in various configurations as shown in FIGS. 14–16.

Referring to FIG. 14, there are installed more than one, for instance two, work depot stations 4A and 4B between a machining station 3 and an assembling station 5 of the work transportation line. The machining station 3 may be replaced by a machined or crude work supply station. In such a case, before and after the respective work depot stations 4A and 4B there may be installed machining stations 3A, 3B and 3C. A plurality of crude works from the work supply station 3 are machined at the first machining station 3A and then, stored in the first work depot station 4A. When there is a request of delivery of a specific kind of a machined work from the second machining station 3B, one of machined works of the subject kind in conformity with the request is carried out of the first work depot station 4A toward the second machining station 3B. After the work has been machined at the second machining station 3B, it is stored in the second work depot station 4B. The first work depot station 4A delivers various kinds of machined works in order of requests of the second machining station 3B. Similarly, when there is a request of delivery of a specific kind of a machined work from the third machining station 3C, one of machined works of the subject kind in conformity with the request of the third machining station 3C is carried out of the second work depot station 4A toward the third machining station 3C. After the work has been further machined at the third machining station 3C, it is transported to the assembling station 5.

If these work depot stations 4A and 4B have a shortage of any kind of works lower than a predetermined lower stock limitation, a request of delivery of a specific kind of works from the second work depot station 4B is preferential over any request of delivery from the first work depot station 4B. However, if the second work depot station 4B has a shortage of any kind of machined works lower than a predetermined lower stock limitation, a request of delivery of the subject kind of works from the second work depot station 4B is preferential over any request of delivery from the first work depot station 4B so as to deliver the subject kind of machined works to the second machining station 3B from the first work depot station 4A and to the first machining station 3A from the crude work supply station 3. Accordingly, if a plurality of these work depot stations 4A and 4B have shortages of work stock, machined works of kinds in conformity with a request from a downstream work depot station is preferentially delivered, so as to avoid that the work transportation line is stopped due to a shortage of any kind of machined works at the assembling station 5 and consequently, provide an increased working efficiency.

In addition, if both the work depot stations 4A and 4B are supplied with any kind of machined works in access over a predetermined upper stock limitation, a request of delivery of a specific kind of machined works from the second work depot station 4B is preferential over any request of delivery from the first work depot station 4B and the subject kind of machined works are suspended from being delivered from the first work depot station 4A to the second machining station 3B and from the crude work supply 3 to the first machining station 3A. This leads to leaving storage cells empty as small in number as possible.

Referring to FIG. 15, the work transportation line has a plurality of, for instance three in this embodiment, machining stations 3A, 3B and 3C individually connected by independent first conveyers, respectively, to a work depot station 4, which are different in type of machining from one another. When the work depot station 4 has a shortage of stock of any kind of machined works lower than the lower stock limitation, only one of these machining stations 3A–3C is preferentially instructed to deliver the kind of machined works to the work depot station 4. On the other hand, when the work depot station 4 has an over stock of any kind of machined works above the upper stock limitation, one of these machining stations 3A–3C which machines the kind of works is suspended to deliver machined work so as to deliver other kinds of machined works to the work depot station 4.

Referring to FIG. 16, the work transportation line has a plurality of, for instance three in this embodiment, provisional work depot stations 4F, 4G and 4H before a work depot station 4 for temporally retaining three kinds of machined works, respectively. When the work depot station 4 has a shortage of stock of any kind of machined works below the lower stock limitation, only one of these provisional work depot stations 4F, 4G and 4H is preferentially instructed to deliver the kind of machined works to the work depot station 4. On the other hand, when the work depot station 4 has an over stock of any kind of machined works above the upper stock limitation, one of these provisional work depot stations 4F, 4G and 4H which stores the kind of works is suspended to deliver machined work so as to deliver other kinds of machined works to the work depot station 4.

Although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A storage management system for a work depot station disposed between two processing stations on a work transportation line for temporarily loading receptacles of the work depot station with a plurality of kinds of works from a preceding processing station one after another by means of a work handling apparatus and delivering works of a kind in conformity with a request from a succeeding processing station by means of said work handling apparatus, said storage management system comprising:

data storage means for storing work data of one of said works put in each said receptacle;

replacing means for replacing said work data of said one work in one of said receptacles stored in said data storage means with work data of another work with which said one of said receptacle previously loaded with said one work is loaded;

data search means for searching said work data of said works in said receptacles so as to find any one of said receptacles loaded with said works of a kind in conformity with a request of delivery from said succeeding processing station;

drive control means for driving said work handling apparatus to put out said work in said one receptacle found by means of said data search means; and work inspection means provided before said work depot station for a sampling inspection of one of a lot of said works to decide acceptance and rejection of said lot and providing for said works of said lot a retention signal for prohibiting access of said work handling apparatus to said receptacles which are loaded with said works of said lot until said work inspection means finishes said sampling inspection.

2. A storage management system for a work depot station disposed between two processing stations on a work transportation line for temporarily loading receptacles of the work depot station with a plurality of kinds of works from a preceding processing station one after another by means of a work handling apparatus and delivering works of a kind in conformity with a request from a succeeding processing station by means of said work handling apparatus, said storage management system comprising:

data storage means for storing work data of one of said works put in each said receptacle;

replacing means for replacing said work data of said one work in one of said receptacles stored in said data storage means with work data of another work with which said one of said receptacle previously loaded with said one work is loaded;

data search means for searching said work data of said works in said receptacles so as to find any one of said receptacles loaded with said works of a kind in conformity with a request of delivery from said succeeding processing station;

drive control means for driving said work handling apparatus to put out said work in said one receptacle found by means of said data search means;

work inspection means provided before said work depot station for a sampling inspection of one of a lot of said works to decide acceptance and rejection of said lot and providing for said works of said lot a retention signal for prohibiting access of said work handling apparatus to said receptacles which are loaded with said works of said lot until said work inspection means finishes said sampling inspection; and ejecting means for causing said work handling apparatus to eject said works of a lot decided to be rejected by said work inspection means out of said work storage depot.

3. A storage management system for a work depot station disposed between two stations on a work transportation line for loading receptacles of the work depot station with a plurality of kinds of works from a preceding station one after another by means of a work handling apparatus and delivering works of a kind in conformity with a request from a succeeding station by means of said work handling apparatus, said storage management system comprising:

data storage means for storing numbers of said kinds of works in stock in said work depot station;

shortage detection means for comparing said numbers with lower stock limitations assigned for said kinds of works, respectively so as to find any kind of works whose number is less in stock than said lower stock limitation; and work delivery control means for preferentially providing delivery of said kind of works found to be less in stock than said lower stock limitation into said work depot station, wherein said work depot station includes a plurality of work stores along said work transportation line which are loaded with said works in order from a foremost one of said work stores to a rearmost one of said work stores, said work delivery control means preferentially providing delivery of said kind of works found to be less in stock than said lower stock limitation into a rearmost one among said work stores which is found to be less in stock than said lower stock limitation with respect to said kind of works.

4. The storage control system of claim 3, wherein said work transportation line includes a plurality of said preceding stations one for each kind of works, said work delivery control means preferentially providing delivery of said kind of works found to be less in stock than said lower stock limitation from one of said preceding stations assigned for said kind of works.

5. The storage control system of claim 3, further comprising a plurality of provisional work depot stations each for kind of works, wherein said work delivery control means preferentially providing delivery of said kind of works found to be less in stock than said lower stock limitation from one of said provisional work depot stations assigned for said kind of works.

6. A storage management system for a work depot station disposed between two processing stations on a work transportation line for loading receptacles of the work depot station with a plurality of kinds of works from a preceding processing station one after another by means of a work handling apparatus and delivering works of a kind in conformity with a request from a succeeding processing station by means of said work handling apparatus, said storage management system comprising:

data storage means for storing numbers of said kinds of works in stock in said work depot station;

detection means for comparing said numbers with upper stock limitations assigned for said kinds of works, respectively, so as to find any kind of works whose number is greater in stock than said upper stock limitations; and work delivery control means for preferentially suspending delivery into said work depot station of said kind of works found to be greater in stock than said upper stock limitation for said kind of works, wherein said work depot station comprises a plurality of work stores along said work transportation line which are loaded with said works in order from a foremost one of said work stores to a rearmost one of said work stores and said work delivery control means preferentially provides delivery of works of kinds other than said kind of works which is found to be greater in stock than said upper stock limitation into a rearmost one among said work stores which are found not to be greater in stock than said upper stock limitation with respect to said kind of works.

7. The storage control system of claim 6, wherein said work transportation line includes a plurality of said preceding stations one for each kind of works, said work delivery control means preferentially providing delivery of said kind of works found to be greater in stock than said upper stock limitation from one of said preceding stations assigned for said kind of works.

8. The storage control system of claim 6, further comprising a plurality of provisional work depot stations one for each kind of works, wherein said work delivery control means preferentially providing delivery of said kind of works found to be greater in stock than said upper stock limitation from one of said provisional work depot stations assigned for said kind of works.

9. A storage management system for a work depot station disposed between two processing stations on a work transportation line for temporarily loading receptacles of the work depot station with different kinds of works from a preceding processing station one after another by means of a work handling apparatus and delivering works of a kind in conformity with a request from a succeeding processing station by means of said work handling apparatus, said storage management system comprising:

work inspection means provided before said work depot station for inspecting a lot of each said kind of works to decide acceptance of said lot;

data storage means for storing data on retention of delivery of said works of said lot to said work depot station until said work inspection means concludes said inspection of said lot of said works; and drive control means for prohibiting said work handling apparatus from delivering said works to said work depot station according to said data of retention.

* * * * *